United States Patent
Lee et al.

(10) Patent No.: US 8,175,197 B2
(45) Date of Patent: May 8, 2012

(54) PREAMBLE DETECTION WITH UNKNOWN CHANNEL

(75) Inventors: Jungwon Lee, Cupertino, CA (US); Hui-Ling Lou, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 942 days.

(21) Appl. No.: 11/717,405

(22) Filed: Mar. 13, 2007

(65) Prior Publication Data

US 2007/0217534 A1    Sep. 20, 2007

Related U.S. Application Data

(63) Continuation of application No. 11/648,735, filed on Dec. 29, 2006.

(60) Provisional application No. 60/783,300, filed on Mar. 17, 2006, provisional application No. 60/792,508, filed on Apr. 17, 2006, provisional application No. 60/809,733, filed on May 31, 2006, provisional application No. 60/826,392, filed on Sep. 21, 2006.

(51) Int. Cl.
*H03D 1/00* (2006.01)

(52) U.S. Cl. ........ 375/343; 375/260; 375/267; 375/295; 375/296; 375/297; 375/340; 375/345; 375/346; 375/349; 375/350

(58) Field of Classification Search .................. 375/260, 375/267, 295, 296, 297, 340, 345, 346, 343; 370/203, 204, 205, 208, 209, 210
See application file for complete search history.

(56) References Cited

U.S. PATENT DOCUMENTS

| | | | | |
|---|---|---|---|---|
| 5,852,630 A | * | 12/1998 | Langberg et al. | 375/219 |
| 7,257,165 B2 | * | 8/2007 | Gardner | 375/260 |
| 7,366,222 B2 | * | 4/2008 | Song et al. | 375/130 |

(Continued)

FOREIGN PATENT DOCUMENTS

CA          2 530 498 A1       1/2005

OTHER PUBLICATIONS

IEEE Std 802.16-2005 (Revision of IEEE Std 802.16-2005) IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1; Feb. 28, 2006; 864 pages.

(Continued)

*Primary Examiner* — Dhaval Patel

(57) ABSTRACT

A system includes a correlation module and a control module. The correlation module is configured to generate correlation values based on a correlation of modulated signals with a plurality of preamble sequences and generate correlation values. The modulated signals include sub-carriers modulated using orthogonal frequency domain multiplexing (OFDM). The control module is configured to select a largest correlation value from the correlation values and detect one of the preamble sequences in the modulated signals upon determining that a magnitude of the largest correlation value is greater than or equal to a first predetermined threshold. The control module divides N of the sub-carriers into L bands in response to a channel gain of the sub-carriers not being substantially the same for all of the sub-carriers, where N and L are integers greater than 1, and where each of the L bands includes N/L of the sub-carriers.

52 Claims, 17 Drawing Sheets

U.S. PATENT DOCUMENTS

| | | | |
|---|---|---|---|
| 7,386,058 B2* | 6/2008 | Fujii | 375/267 |
| 7,564,909 B2 | 7/2009 | Sung et al. | |
| 7,580,490 B2* | 8/2009 | Suh et al. | 375/349 |
| 7,590,193 B2* | 9/2009 | Han | 375/326 |
| 7,596,111 B2* | 9/2009 | Karabinis | 370/316 |
| 2004/0001430 A1 | 1/2004 | Gardner | |
| 2005/0063480 A1* | 3/2005 | Sang et al. | 375/260 |
| 2005/0147024 A1 | 7/2005 | Jung et al. | |
| 2006/0025136 A1* | 2/2006 | Fujita et al. | 455/436 |
| 2006/0209978 A1 | 9/2006 | Jungnickel et al. | |
| 2007/0183391 A1 | 8/2007 | Akita et al. | |
| 2008/0086670 A1* | 4/2008 | Krouk et al. | 714/752 |

OTHER PUBLICATIONS

Gavin Yeung et al; "Detailed OFDM Modeling in Network Simulation of Mobile Ad Hoc Networks"; ACM PADS, May 2004; 9 pages.

OFDM Receivers for Broadband-Transmission; www.ert.rwth-aachen.de/Projekte/Theo/OFDM/www_ofdm.html; May 1999; 15 pages.

PCT International Search Report and Written Opinion dated Oct. 8, 2007 for International Application No. PCT/US2007/006739; 11 pages.

* cited by examiner

Preamble modulation series per segment and IDcell for the 1K FFT mode

| Index | IDcell | Segment | Series to modulate (in hexadecimal format) |
|---|---|---|---|
| 0 | 0 | 0 | 0xA6F294537B285E1844677D133E4D53CCB1F182DE00489E53E6B6E77065C7EE7D0ADBEAF |
| 1 | 1 | 0 | 0x668321CBBE7F462E6C2A07E8BBDA2C7F7946D5F69E35AC8ACF7D64AB4A33C467001F3B2 |
| 2 | 2 | 0 | 0x1C75D30B2DF72CEC9117A0BD8EAF8E0502461FC07456AC906ADE03E9B5AB5E1D3F98C6E |
| 3 | 3 | 0 | 0x5F9A2E5CA7CC69A5227104FB1CC2262809F3B10D0542B9BDFDA4A73A7046096DF0E8D3D |
| 4 | 4 | 0 | 0x82F8A0AB918138D84BB86224F6C342D81BC8BFE791CA9EB54096159D672E91C6E13032F |
| 5 | 5 | 0 | 0xEE27E59B84CCF15BB156sEF90D478CD2C49EE8A70DE368EED7C9420B0C6FFAF9AF035FC |
| 6 | 6 | 0 | 0xC1DF5AE28D1CA6A8917BCDAF4E73BD93F931C44F93C3F12F0132FB643EFD5885C8B2BCB |
| 7 | 7 | 0 | 0xFCA36CCCF7F3E0602696DF745A68DB948C57DFA9575BEA1F05725C42155898F0A63A248 |
| ... | ... | ... | ... |

FIG. 4

PREAMBLE DETECTION WITH UNKNOWN CHANNEL

CROSS-REFERENCE TO RELATED APPLICATIONS

This application is a continuation of U.S. Ser. No. 11/648,735, filed Dec. 29, 2006, which application claims the benefit of U.S. Provisional Application No. 60/783,300, filed on Mar. 17, 2006, U.S. Provisional Application No. 60/792,508, filed on Apr. 17, 2006, U.S. Provisional Application No. 60/809,733, filed on May 31, 2006, and U.S. Provisional Application No. 60/826,392, Sep. 21, 2006. The disclosures of the above applications are incorporated herein by reference in their entirety.

FIELD

The present disclosure relates to communication systems, and more particularly to detecting preamble sequences in systems using orthogonal frequency domain multiplexing (OFDM).

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Referring now to FIG. 1, a typical communication system 10 comprises an information source 12, a transmitter 13, a communication channel 20, a receiver 27, and a destination 28. The transmitter 13 comprises a source encoder 14, a channel encoder 16, and a modulator 18. The receiver 27 comprises a demodulator 22, a channel decoder 24, and a source decoder 26.

The information source 12 may be an analog source such as a sensor that outputs information as continuous waveforms or a digital source such as a computer that outputs information in a digital form. The source encoder 14 converts the output of the information source 12 into a sequence of binary digits (bits) called an information sequence u. The channel encoder 16 converts the information sequence u into a discrete encoded sequence v called a codeword. The modulator 18 transforms the codeword into a waveform of duration T seconds that is suitable for transmission.

The waveform output by the modulator 18 is transmitted via the communication channel 20. Typical examples of the communication channel 20 are telephone lines, wireless communication channels, optical fiber cables, etc. Noise, such as electromagnetic interference, inter-channel crosstalk, etc., may corrupt the waveform.

The demodulator 22 receives the waveform. The demodulator 22 processes each waveform and generates a received sequence r that is either a discrete (quantized) or a continuous output. The channel decoder 24 converts the received sequence r into a binary sequence u' called an estimated information sequence. The source decoder 26 converts u' into an estimate of the output of the information source 12 and delivers the estimate to the destination 28. The estimate may be a faithful reproduction of the output of the information source 12 when u' resembles u despite decoding errors that may be caused by the noise.

Communication systems use different modulation schemes to modulate and transmit data. For example, a radio frequency (RF) carrier may be modulated using techniques such as frequency modulation, phase modulation, etc. In wireline communication systems, a transmitted signal generally travels along a path in a transmission line between a transmitter and a receiver. In wireless communication systems, however, a transmitted signal may travel along multiple paths. This is because the transmitted signal may be reflected and deflected by objects such as buildings, towers, airplanes, cars, etc., before the transmitted signal reaches a receiver. Each path may be of different length. Thus, the receiver may receive multiple versions of the transmitted signal. The multiple versions may interfere with each other causing inter symbol interference (ISI). Thus, retrieving original data from the transmitted signal may be difficult.

To alleviate this problem, wireless communication systems often use a modulation scheme called orthogonal frequency division multiplexing (OFDM). In OFDM, a wideband carrier signal is converted into a series of independent narrowband sub-carrier signals that are adjacent to each other in frequency domain. Data to be transmitted is split into multiple parallel data streams. Each data stream is modulated using a sub-carrier. A channel over which the modulated data is transmitted comprises a sum of the narrowband sub-carrier signals, which may overlap.

When each sub-carrier closely resembles a rectangular pulse, modulation can be easily performed by Inverse Discrete Fourier Transform (IDFT), which can be efficiently implemented as an Inverse Fast Fourier Transform (IFFT). When IFFT is used, the spacing of sub-carriers in the frequency domain is such that when the receiver processes a received signal at a particular frequency, all other signals are nearly zero at that frequency, and ISI is avoided. This property is called orthogonality, and hence the modulation scheme is called orthogonal frequency division multiplexing (OFDM).

Referring now to FIGS. 2A-2C, a wireless communication system 50 may comprise base stations BS1, BS2, and BS3 (collectively BS) and one or more mobile stations (MS). Each BS may comprise a processor 30, a medium access controller (MAC) 32, a physical layer (PHY) module 34, and an antenna 36 as shown in FIG. 2B. Similarly, each MS may comprise a processor 40, a medium access controller (MAC) 42, a physical layer (PHY) module 44, and an antenna 46 as shown in FIG. 2C. The PHY modules 34 and 44 may comprise radio frequency (RF) transceivers (not shown) that transmit and receive data via antennas 36 and 46, respectively. Each BS and MS may transmit and receive data while the MS moves relative to the BS.

Specifically, each BS may transmit data using orthogonal frequency division multiplexing access (OFDMA) system. Each BS may transmit data typically in three segments: SEG1, SEG2, and SEG3. The MS, which moves relative to each BS, may receive data from one or more base stations depending on the location of the MS relative to each BS. For example, the MS may receive data from SEG 3 of BS1 and SEG 2 of BS2 when the MS is located as shown in FIG. 2A.

Relative motion between MS and BS may cause Doppler shifts in signals received by the MS. This can be problematic since systems using OFDMA are inherently sensitive to carrier frequency offsets (CFO). Therefore, pilot tones are generally used for channel estimation refinement. For example, some of the sub-carriers may be designated as pilot tones for correcting residual frequency offset errors.

Additionally, the PHY module 34 of each BS typically adds a preamble to a data frame that is to be transmitted. Specifically, the PHY module 34 modulates and encodes the data frame comprising the preamble at a data rate specified by the MAC 34 and transmits the data frame. When the PHY module 44 of the MS receives the data frame, the PHY module 44 uses the preamble in the data frame to detect a beginning of packet transmission and to synchronize to a transmitter clock of the BS.

According to the I.E.E.E. standard 802.16e, which is incorporated herein by reference in its entirety, a first symbol in the data frame transmitted by the BS is a preamble symbol from a preamble sequence. The preamble sequence typically contains an identifier called IDcell, which is a cell ID of the BS, and segment information. The BS selects the preamble sequence based on the IDcell and the segment number of the BS. Each BS may select different preamble sequences. Additionally, each BS may select preamble sequences that are distinct among the segments of that BS.

The BS modulates multiple sub-carriers with the selected preamble sequence. Thereafter, the BS performs IFFT, adds a cyclic prefix, and transmits a data frame. The MS uses the cyclic prefix to perform symbol timing and fractional carrier frequency synchronization. Unless the MS knows the preamble sequence, however, the MS cannot associate itself to a particular segment of a particular BS.

SUMMARY

A system comprises a differential demodulation module and a correlation module. The differential demodulation module differentially demodulates modulated signals to generate differentially demodulated signals. The correlation module correlates the differentially demodulated signals with derived preamble sequences and generates correlation values.

In another feature, the modulated signals include sub-carriers that are modulated using orthogonal frequency domain multiplexing (OFDM).

In another feature, every $P^{th}$ one of the sub-carriers is modulated with a preamble bit, where P is an integer greater than or equal to 1.

In another feature, every $P^{th}$ one of the sub-carriers has substantially the same channel phase.

In another feature, each one of the correlation values has a real part and an imaginary part.

In another feature, the system further comprises a control module that selects one of the correlation values having a largest real part and that detects a preamble sequence in the modulated signals upon determining that the largest real part is greater than or equal to a predetermined threshold. The predetermined threshold is based on the signal strength of the modulated signals. The control module identifies a segment of a base station that transmitted the modulated signals based on the preamble sequence.

In another feature, every $P^{th}$ one of the sub-carriers has substantially the same differential channel phase.

In another feature, the system further comprises a control module that selects a largest correlation value from the correlation values and that detects a preamble sequence in the modulated signals upon determining that a magnitude of the largest correlation value is greater than or equal to a predetermined threshold. The predetermined threshold is based on the signal strength of the modulated signals. The control module identifies a segment of a base station that transmitted the modulated signals based on the preamble sequence.

In another feature, the differential demodulation module generates the differentially demodulated signals by multiplying a $Q^{th}$ one of the modulated signals by a complex conjugate of a $(Q+P)^{th}$ one of the modulated signals, where Q is an integer greater than or equal to 1.

In another feature, the derived preamble sequences are derived from preamble sequences, and wherein each of the preamble sequences is different from others of the preamble sequences.

In another feature, each bit of one of the derived preamble sequences has a first state when a corresponding bit and a bit adjacent to the corresponding bit in a corresponding one of the preamble sequences have opposite states, and the each bit has a second state when the corresponding bit and the bit adjacent to the corresponding bit have the same state.

In another feature, the derived preamble sequences are stored in one of the correlation module and the control module. The derived preamble sequences have a cross-correlation value that is less than or equal to a predetermined cross-correlation threshold. The predetermined cross-correlation threshold is less than approximately 0.2 for an orthogonal frequency domain multiplexing (OFDM) system using a 1024 fast Fourier transform (FFT) mode.

In another feature, the modulated signals include a fractional carrier frequency offset (CFO) that generates a phase error that is substantially the same in each one of the modulated signals.

In another feature, the modulated signals include an integer carrier frequency offset (CFO) that generates a phase error that is substantially the same in each one of the modulated signals. The correlation module correlates the derived preamble sequences with the differentially demodulated signals having the integer CFO.

In another feature, the modulated signals include a linearly increasing phase offset generated by a symbol timing offset.

In another feature, the control module calculates a symbol timing offset by multiplying a phase angle of the largest correlation value by $(N/2\pi P)$, where N is a number of sub-carriers in an N fast Fourier transform (FFT) mode, and where N is an integer greater than 1. N is one of 128, 512, 1024, and 2048.

In another feature, a physical layer module (PHY) comprises the system and further comprises a transceiver module that communicates with the differential demodulation module and that receives the modulated signals.

In another feature, a network device comprises the PHY and further comprises at least one antenna that communicates with the transceiver module.

In still other features, a method comprises differentially demodulating modulated signals, generating differentially demodulated signals from the modulated signals, correlating the differentially demodulated signals with derived preamble sequences, and generating correlation values based on the correlating.

In another feature, the method further comprises differentially demodulating sub-carriers that are included in the modulated signals and that are modulated using orthogonal frequency domain multiplexing (OFDM), wherein every $P^{th}$ one of the sub-carriers is modulated with a preamble bit, where P is an integer greater than or equal to 1.

In another feature, the method further comprises differentially demodulating the sub-carriers, wherein the every $P^{th}$ one of the sub-carriers has substantially the same channel phase.

In another feature, the method further comprises determining a real part and an imaginary part of each one of the correlation values.

In another feature, the method further comprises selecting one of the correlation values having a largest real part and detecting a preamble sequence in the modulated signals upon determining that the largest real part is greater than or equal to a predetermined threshold. The method further comprises determining the predetermined threshold based on the signal strength of the modulated signals. The method further comprises identifying a segment of a base station that transmitted the modulated signals based on the preamble sequence.

In another feature, the method further comprises differentially demodulating the sub-carriers, wherein the every $P^{th}$ one of the sub-carriers has substantially the same differential channel phase.

In another feature, the method further comprises selecting a largest correlation value from the correlation values and detecting a preamble sequence in the modulated signals upon determining that a magnitude of the largest correlation value is greater than or equal to a predetermined threshold. The method further comprises determining the predetermined threshold based on the signal strength of the modulated signals. The method further comprises identifying a segment of a base station that transmitted the modulated signals based on the preamble sequence.

In another feature, the method further comprises generating the differentially demodulated signals by multiplying a $Q^{th}$ one of the modulated signals by a complex conjugate of a $(Q+P)^{th}$ one of the modulated signals, where Q is an integer greater than or equal to 1.

In another feature, the method further comprises deriving the derived preamble sequences from preamble sequences, wherein each of the preamble sequences is different from others of the preamble sequences, and wherein the derived preamble sequences have a cross-correlation value that is less than or equal to a predetermined cross-correlation threshold. The method further comprises determining that the predetermined cross-correlation threshold is less than approximately 0.2 for an orthogonal frequency domain multiplexing (OFDM) method using a 1024 fast Fourier transform (FFT) mode.

In another feature, the method further comprises generating each bit of one of the derived preamble sequences having a first state when a corresponding bit and a bit adjacent to the corresponding bit in a corresponding one of the preamble sequences have opposite states, and generating the each bit having a second state when the corresponding bit and the bit adjacent to the corresponding bit have the same state.

In another feature, the method further comprises storing the derived preamble sequences.

In another feature, the method further comprises differentially demodulating the modulated signals having a fractional carrier frequency offset (CFO) that generates a phase error that is substantially the same in each one of the modulated signals.

In another feature, the method further comprises differentially demodulating the modulated signals having an integer carrier frequency offset (CFO) that generates a phase error that is substantially the same in each one of the modulated signals. The method further comprises correlating the derived preamble sequences with the differentially demodulated signals having the integer CFO.

In another feature, the method further comprises differentially demodulating the modulated signals having a linearly increasing phase offset generated by a symbol timing offset.

In another feature, the method further comprises calculating a symbol timing offset by multiplying a phase angle of the largest correlation value by $(N/2\pi P)$, where N is a number of sub-carriers in an N fast Fourier transform (FFT) mode, and where N is an integer greater than 1. N is one of 128, 512, 1024, and 2048.

In still other features, a system comprises differential demodulation means for differentially demodulating modulated signals to generate differentially demodulated signals and correlation means for correlating the differentially demodulated signals with derived preamble sequences and generating correlation values.

In another feature, the modulated signals include sub-carriers that are modulated using orthogonal frequency domain multiplexing (OFDM).

In another feature, every $P^{th}$ one of the sub-carriers is modulated with a preamble bit, where P is an integer greater than or equal to 1.

In another feature, every $P^{th}$ one of the sub-carriers has substantially the same channel phase.

In another feature, each one of the correlation values has a real part and an imaginary part.

In another feature, the system further comprises control means for selecting one of the correlation values having a largest real part and detecting a preamble sequence in the modulated signals upon determining that the largest real part is greater than or equal to a predetermined threshold. The predetermined threshold is based on the signal strength of the modulated signals. The control means identifies a segment of a base station that transmitted the modulated signals based on the preamble sequence.

In another feature, every $P^{th}$ one of the sub-carriers has substantially the same differential channel phase.

In another feature, the system further comprises control means for selecting a largest correlation value from the correlation values and detecting a preamble sequence in the modulated signals upon determining that a magnitude of the largest correlation value is greater than or equal to a predetermined threshold. The predetermined threshold is based on the signal strength of the modulated signals. The control means identifies a segment of a base station that transmitted the modulated signals based on the preamble sequence.

In another feature, the differential demodulation means generates the differentially demodulated signals by multiplying a $Q^{th}$ one of the modulated signals by a complex conjugate of a $(Q+P)^{th}$ one of the modulated signals, where Q is an integer greater than or equal to 1.

In another feature, the derived preamble sequences are derived from preamble sequences, and wherein each of the preamble sequences is different from others of the preamble sequences.

In another feature, each bit of one of the derived preamble sequences has a first state when a corresponding bit and a bit adjacent to the corresponding bit in a corresponding one of the preamble sequences have opposite states, and the each bit has a second state when the corresponding bit and the bit adjacent to the corresponding bit have the same state.

In another feature, the derived preamble sequences are stored in one of the correlation means and the control means.

In another feature, the derived preamble sequences have a cross-correlation value that is less than or equal to a predetermined cross-correlation threshold. The predetermined cross-correlation threshold is less than approximately 0.2 for an orthogonal frequency domain multiplexing (OFDM) system using a 1024 fast Fourier transform (FFT) mode.

In another feature, the modulated signals include a fractional carrier frequency offset (CFO) that generates a phase error that is substantially the same in each one of the modulated signals.

In another feature, the modulated signals include an integer carrier frequency offset (CFO) that generates a phase error that is substantially the same in each one of the modulated signals. The correlation means correlates the derived preamble sequences with the differentially demodulated signals having the integer CFO.

In another feature, the modulated signals include a linearly increasing phase offset generated by a symbol timing offset.

In another feature, the control means calculates a symbol timing offset by multiplying a phase angle of the largest correlation value by (N/2πP), where N is a number of sub-carriers in an N fast Fourier transform (FFT) mode, and where N is an integer greater than 1. N is one of 128, 512, 1024, and 2048.

In another feature, a physical layer means (PHY) for communicating comprises the system and further comprises transceiver means for communicating with the differential demodulation means and receiving the modulated signals.

In another feature, a network device comprises the PHY means and further comprises at least one antenna means for communicating with the transceiver means.

In still other features, a computer program executed by a processor comprises differentially demodulating modulated signals, generating differentially demodulated signals from the modulated signals, correlating the differentially demodulated signals with derived preamble sequences, and generating correlation values based on the correlating.

In another feature, the computer program further comprises differentially demodulating sub-carriers that are included in the modulated signals and that are modulated using orthogonal frequency domain multiplexing (OFDM), wherein every $P^{th}$ one of the sub-carriers is modulated with a preamble bit, where P is an integer greater than or equal to 1.

In another feature, the computer program further comprises differentially demodulating the sub-carriers, wherein the every $P^{th}$ one of the sub-carriers has substantially the same channel phase.

In another feature, the computer program further comprises determining a real part and an imaginary part of each one of the correlation values.

In another feature, the computer program further comprises selecting one of the correlation values having a largest real part and detecting a preamble sequence in the modulated signals upon determining that the largest real part is greater than or equal to a predetermined threshold. The computer program further comprises determining the predetermined threshold based on the signal strength of the modulated signals. The computer program further comprises identifying a segment of a base station that transmitted the modulated signals based on the preamble sequence.

In another feature, the computer program further comprises differentially demodulating the sub-carriers, wherein the every $P^{th}$ one of the sub-carriers has substantially the same differential channel phase.

In another feature, the computer program further comprises selecting a largest correlation value from the correlation values and detecting a preamble sequence in the modulated signals upon determining that a magnitude of the largest correlation value is greater than or equal to a predetermined threshold. The computer program further comprises determining the predetermined threshold based on the signal strength of the modulated signals. The computer program further comprises identifying a segment of a base station that transmitted the modulated signals based on the preamble sequence.

In another feature, the computer program further comprises generating the differentially demodulated signals by multiplying a $Q^{th}$ one of the modulated signals by a complex conjugate of a $(Q+P)^{th}$ one of the modulated signals, where Q is an integer greater than or equal to 1.

In another feature, the computer program further comprises deriving the derived preamble sequences from pre-amble sequences, wherein each of the preamble sequences is different from others of the preamble sequences, and wherein the derived preamble sequences have a cross-correlation value that is less than or equal to a predetermined cross-correlation threshold. The computer program further comprises determining that the predetermined cross-correlation threshold is less than approximately 0.2 for an orthogonal frequency domain multiplexing (OFDM) computer program using a 1024 fast Fourier transform (FFT) mode.

In another feature, the computer program further comprises generating each bit of one of the derived preamble sequences having a first state when a corresponding bit and a bit adjacent to the corresponding bit in a corresponding one of the preamble sequences have opposite states, and generating the each bit having a second state when the corresponding bit and the bit adjacent to the corresponding bit have the same state.

In another feature, the computer program further comprises storing the derived preamble sequences.

In another feature, the computer program further comprises differentially demodulating the modulated signals having a fractional carrier frequency offset (CFO) that generates a phase error that is substantially the same in each one of the modulated signals.

In another feature, the computer program further comprises differentially demodulating the modulated signals having an integer carrier frequency offset (CFO) that generates a phase error that is substantially the same in each one of the modulated signals. The computer program further comprises correlating the derived preamble sequences with the differentially demodulated signals having the integer CFO.

In another feature, the computer program further comprises differentially demodulating the modulated signals having a linearly increasing phase offset generated by a symbol timing offset.

In another feature, the computer program further comprises calculating a symbol timing offset by multiplying a phase angle of the largest correlation value by (N/2πP), where N is a number of sub-carriers in an N fast Fourier transform (FFT) mode, and where N is an integer greater than 1. N is one of 128, 512, 1024, and 2048.

In still other features, a system comprises a correlation module and a control module. The correlation module correlates modulated signals with a plurality of preamble sequences and generates correlation values. The control module selects a largest correlation value from the correlation values and detects one of the preamble sequences in the modulated signals upon determining that a magnitude of the largest correlation value is greater than or equal to a first predetermined threshold. The first predetermined threshold is based on the signal strength of the modulated signals.

In another feature, each of the preamble sequences is different from others of the preamble sequences. The preamble sequences are stored in one of the correlation module and the control module.

In another feature, the control module identifies a segment of a base station that transmitted the modulated signals based on the one of the preamble sequences.

In another feature, the modulated signals include sub-carriers that are modulated using orthogonal frequency domain multiplexing (OFDM). The sub-carriers have a common channel gain and a random channel phase. Every $P^{th}$ one of the sub-carriers is modulated with a preamble bit, where P is an integer greater than or equal to 1.

In another feature, the preamble sequences have a cross-correlation value of less than or equal to a second predetermined threshold. The second predetermined threshold is less than approximately 0.2 for an orthogonal frequency domain multiplexing (OFDM) system using a 1024 fast Fourier transform (FFT) mode.

In another feature, the modulated signals include a fractional carrier frequency offset (CFO) that generates a phase error that is substantially the same in each one of the modulated signals.

In another feature, the modulated signals include an integer carrier frequency offset (CFO) that generates a phase error that is substantially the same in each one of the modulated signals.

In another feature, a physical layer module (PHY) comprises the system and further comprises a transceiver module that communicates with the correlation module and the control module and that receives the modulated signals.

In another feature, a network device comprises the PHY and further comprises at least one antenna that communicates with the transceiver module.

In another feature, the control module divides N of the sub-carriers into L bands when a channel gain of the sub-carriers is not substantially the same for all of the sub-carriers, where N and L are integers greater than or equal to 1, and where each of the L bands includes N/L of the sub-carriers.

In another feature, the correlation module correlates symbols in every $P^{th}$ one of the N/L sub-carriers in each of the L bands with corresponding symbols in each of the preamble sequences and generates intra-band correlation values for each band for each of the preamble sequences, where P is an integer greater than or equal to 1.

In another feature, the control module generates a band correlation value for each of the L bands and for each of the preamble sequences by adding the intra-band correlation values. The control module further generates a magnitude of each of the band correlation value. The control module further generates the correlation values by adding the magnitude of each of the band correlation value for each of the preamble sequences.

In still other features, a method comprises correlating modulated signals with a plurality of preamble sequences, generating correlation values based on the correlating, selecting a largest correlation value from the correlation values, and detecting one of the preamble sequences in the modulated signals upon determining that a magnitude of the largest correlation value is greater than or equal to a first predetermined threshold. The method further comprises determining the first predetermined threshold based on the signal strength of the modulated signals.

In another feature, the method further comprises storing the preamble sequences, wherein each of the preamble sequences is different from others of the preamble sequences.

In another feature, the method further comprises identifying a segment of a base station that transmitted the modulated signals based on the one of the preamble sequences.

In another feature, the method further comprises receiving the modulated signals that include sub-carriers that are modulated using orthogonal frequency domain multiplexing (OFDM), wherein every $P^{th}$ one of the sub-carriers is modulated with a preamble bit, where P is an integer greater than or equal to 1, and wherein the sub-carriers have a common channel gain and a random channel phase.

In another feature, the method further comprises correlating the modulated signals with the preamble sequences having a cross-correlation value of less than or equal to a second predetermined threshold. The method further comprises determining that the second predetermined threshold is less than approximately 0.2 for an orthogonal frequency domain multiplexing (OFDM) method using a 1024 fast Fourier transform (FFT) mode.

In another feature, the method further comprises receiving the modulated signals having a fractional carrier frequency offset (CFO) that generates a phase error that is substantially the same in each one of the modulated signals.

In another feature, the method further comprises receiving the modulated signals having an integer carrier frequency offset (CFO) that generates a phase error that is substantially the same in each one of the modulated signals.

In another feature, the method further comprises dividing N of the sub-carriers into L bands when a channel gain of the sub-carriers is not substantially the same for all of the sub-carriers, where N and L are integers greater than or equal to 1, and where each of the L bands includes N/L of the sub-carriers.

In another feature, the method further comprises correlating symbols in every $P^{th}$ one of the N/L sub-carriers in each of the L bands with corresponding symbols in each of the preamble sequences and generating intra-band correlation values for each band for each of the preamble sequences, where P is an integer greater than or equal to 1.

In another feature, the method further comprises generating a band correlation value for each of the L bands and for each of the preamble sequences by adding the intra-band correlation values, generating a magnitude of each of the band correlation value, and generating the correlation values by adding the magnitude of each of the band correlation value for each of the preamble sequences.

In still other features, a system comprises correlation means for correlating modulated signals with a plurality of preamble sequences and generating correlation values. The system further comprises control means for selecting a largest correlation value from the correlation values and detecting one of the preamble sequences in the modulated signals upon determining that a magnitude of the largest correlation value is greater than or equal to a first predetermined threshold. The first predetermined threshold is based on the signal strength of the modulated signals.

In another feature, each of the preamble sequences is different from others of the preamble sequences. The preamble sequences are stored in one of the correlation means and the control means.

In another feature, the control means identifies a segment of a base station that transmitted the modulated signals based on the one of the preamble sequences.

In another feature, the modulated signals include sub-carriers that are modulated using orthogonal frequency domain multiplexing (OFDM). The sub-carriers have a common channel gain and a random channel phase. Every $P^{th}$ one of the sub-carriers is modulated with a preamble bit, where P is an integer greater than or equal to 1.

In another feature, the preamble sequences have a cross-correlation value of less than or equal to a second predetermined threshold. The second predetermined threshold is less than approximately 0.2 for an orthogonal frequency domain multiplexing (OFDM) system using a 1024 fast Fourier transform (FFT) mode.

In another feature, the modulated signals include a fractional carrier frequency offset (CFO) that generates a phase error that is substantially the same in each one of the modulated signals.

In another feature, the modulated signals include an integer carrier frequency offset (CFO) that generates a phase error that is substantially the same in each one of the modulated signals.

In another feature, a physical layer means (PHY) for communicating comprises the system and further comprises transceiver means for communicating with the correlation means and the control means and that receives the modulated signals.

In another feature, a network device comprises the PHY means and further comprises at least one antenna means for communicating with the transceiver means.

In another feature, the control means divides N of the sub-carriers into L bands when a channel gain of the sub-carriers is not substantially the same for all of the sub-carriers, where N and L are integers greater than or equal to 1, and where each of the L bands includes N/L of the sub-carriers.

In another feature, the correlation means correlates symbols in every $P^{th}$ one of the N/L sub-carriers in each of the L bands with corresponding symbols in each of the preamble sequences and generates intra-band correlation values for each band for each of the preamble sequences, where P is an integer greater than or equal to 1.

In another feature, the control means generates a band correlation value for each of the L bands and for each of the preamble sequences by adding the intra-band correlation values. The control means further generates a magnitude of each of the band correlation value. The control means further generates the correlation values by adding the magnitude of each of the band correlation value for each of the preamble sequences.

In still other features, a computer program executed by a processor comprises correlating modulated signals with a plurality of preamble sequences, generating correlation values based on the correlating, selecting a largest correlation value from the correlation values, and detecting one of the preamble sequences in the modulated signals upon determining that a magnitude of the largest correlation value is greater than or equal to a first predetermined threshold. The computer program further comprises determining the first predetermined threshold based on the signal strength of the modulated signals.

In another feature, the computer program further comprises storing the preamble sequences, wherein each of the preamble sequences is different from others of the preamble sequences.

In another feature, the computer program further comprises identifying a segment of a base station that transmitted the modulated signals based on the one of the preamble sequences.

In another feature, the computer program further comprises receiving the modulated signals that include sub-carriers that are modulated using orthogonal frequency domain multiplexing (OFDM), wherein every $P^{th}$ one of the sub-carriers is modulated with a preamble bit, where P is an integer greater than or equal to 1, and wherein the sub-carriers have a common channel gain and a random channel phase.

In another feature, the computer program further comprises correlating the modulated signals with the preamble sequences having a cross-correlation value of less than or equal to a second predetermined threshold. The computer program further comprises determining that the second predetermined threshold is less than approximately 0.2 for an orthogonal frequency domain multiplexing (OFDM) computer program using a 1024 fast Fourier transform (FFT) mode.

In another feature, the computer program further comprises receiving the modulated signals having a fractional carrier frequency offset (CFO) that generates a phase error that is substantially the same in each one of the modulated signals.

In another feature, the computer program further comprises receiving the modulated signals having an integer carrier frequency offset (CFO) that generates a phase error that is substantially the same in each one of the modulated signals.

In another feature, the computer program further comprises dividing N of the sub-carriers into L bands when a channel gain of the sub-carriers is not substantially the same for all of the sub-carriers, where N and L are integers greater than or equal to 1, and where each of the L bands includes N/L of the sub-carriers.

In another feature, the computer program further comprises correlating symbols in every $P^{th}$ one of the N/L sub-carriers in each of the L bands with corresponding symbols in each of the preamble sequences and generating intra-band correlation values for each band for each of the preamble sequences, where P is an integer greater than or equal to 1.

In another feature, the computer program further comprises generating a band correlation value for each of the L bands and for each of the preamble sequences by adding the intra-band correlation values, generating a magnitude of each of the band correlation value, and generating the correlation values by adding the magnitude of each of the band correlation value for each of the preamble sequences.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a table showing preamble sequences used by base stations of FIG. 3 to transmit data;

DETAILED DESCRIPTION

Figure 1:
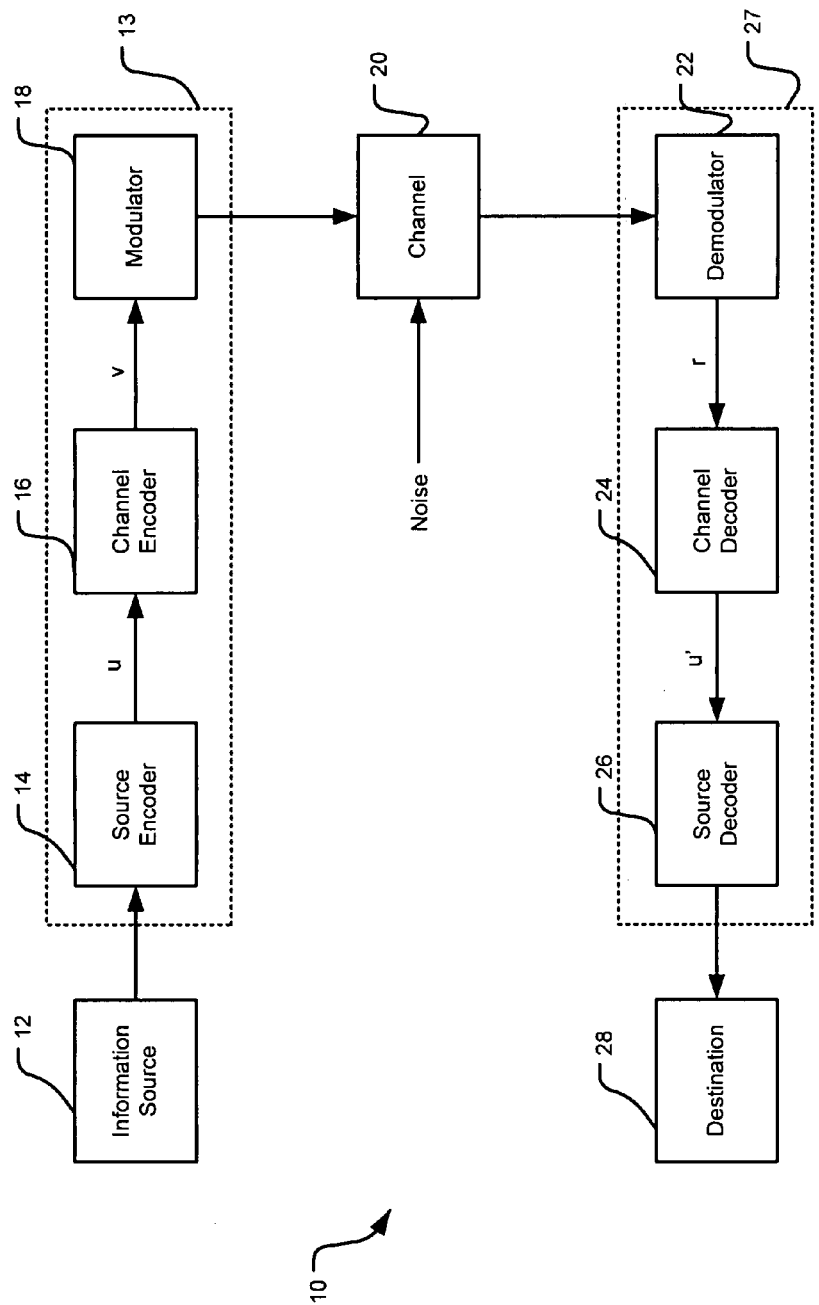
FIG. 1 is a functional block diagram of an exemplary communication system according to the prior art.
Figure 2A:
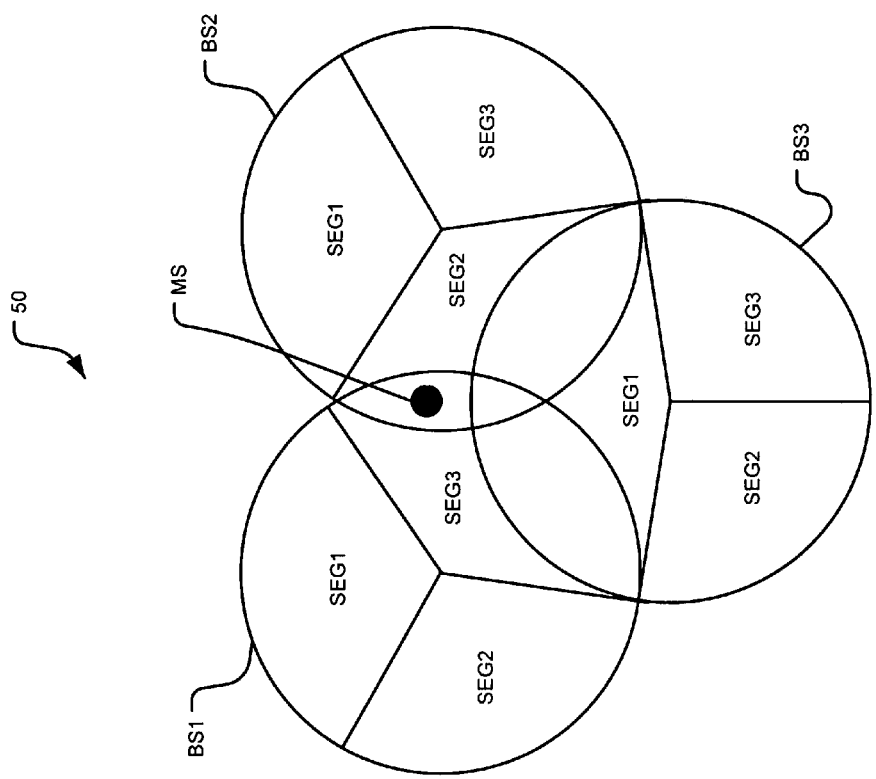
FIG. 2A is a schematic representation of an exemplary wireless communication system comprising three base stations and a mobile station according to the prior art.
Figure 2B:
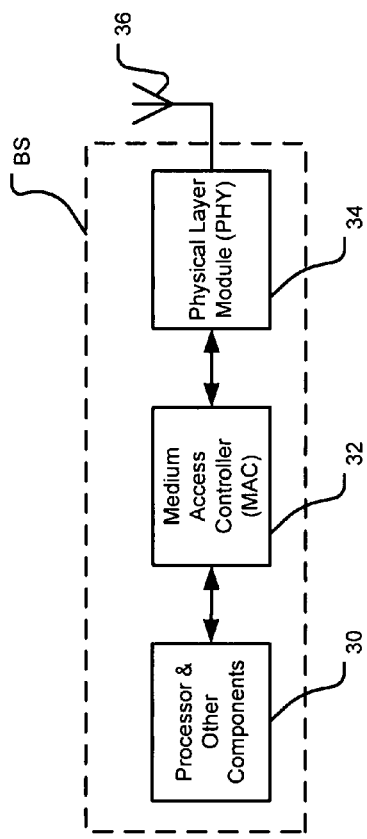
FIG. 2B is a functional block diagram of an exemplary base station utilized in the system of FIG. 2A.
Figure 2C:
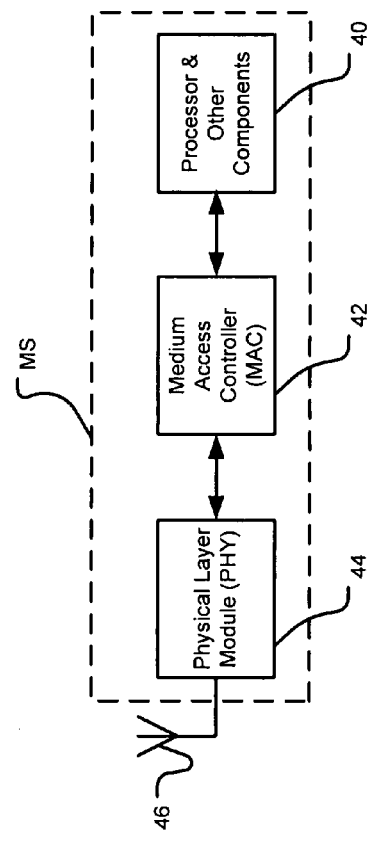
FIG. 2C is a functional block diagram of an exemplary mobile station utilized in the system of FIG. 2A.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 3:
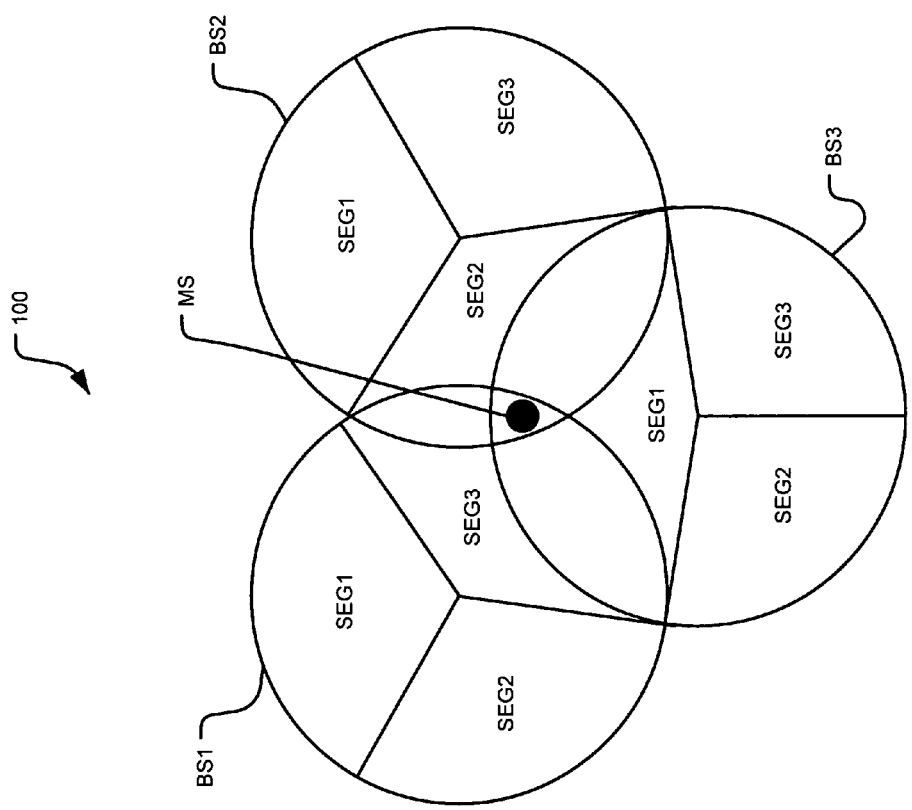
FIG. 3 is a schematic representation of an exemplary wireless communication system comprising three base stations and a mobile station.

Referring now to FIG. 3, a wireless communication system 100 may comprise base stations BS1, BS2, and BS3 (collectively BS) and one or more mobile stations (MS). Generally, one MS may communicate with up to three adjacent base stations. Each BS may transmit data that is modulated using an orthogonal frequency division multiplexing access (OFDMA) system.

Specifically, each BS may transmit data in three segments: SEG1, SEG2, and SEG3. The MS, which may move relative to each BS, may receive data from one or more base stations depending on the location of the MS relative to each BS. For example, the MS may receive data from SEG 3 of BS1, SEG 2 of BS2, and/or SEG 1 of BS3 when the MS is located as shown.

When a receiver in the MS is turned on (i.e., when the MS is powered up), the MS may associate with an appropriate segment of a corresponding BS depending on the location of the MS. The MS, however, can process data in a frame transmitted by a BS only if the MS can correctly detect a preamble sequence in the frame. Specifically, the MS can perform frame synchronization and retrieval of a cell ID (IDcell) and a segment number of the BS from the frame if the MS can detect the preamble sequence in the frame.

Referring now to FIG. 4, OFDMA systems may use 1024 and 512 sub-carriers to modulate and transmit data. OFDMA systems using 1024 and 512 sub-carriers are generally referred to as OFDMA systems having 1024 and 512 FFT modes, respectively. Additionally, I.E.E.E. 802.16e supports 128 FFT and 2048 FFT modes.

A total of 114 preamble sequences exist for OFDMA systems that use fast Fourier transforms (FFT) to modulate 1024 and 512 sub-carriers. Each preamble sequence is unique. That is, each preamble sequence is distinct from another preamble sequence and is identified by an index number. The index number may be referred to as preamble sequence index. Each preamble sequence is 284 and 143 bits long for 1024 and 512 FFT modes, respectively.

Since one MS may typically communicate with up to three base stations, each BS modulates every third sub-carrier. That is, each BS modulates one of every three sub-carriers. Additionally, each BS uses only one bit of the total bits in a preamble sequence when modulating every third sub-carrier. For example, in 1024 FFT mode, the BS may use bit numbers 1, 2, 3, . . . , etc., of the 284 bits in a preamble sequence to modulate sub-carrier numbers 1, 4, 7, . . . , etc., of the 1024 sub-carriers, respectively.

Each BS may use the same set of sub-carriers. Each segment in a BS, however, uses distinct sub-carriers at least for preamble purposes. For example, for each BS, segment 1 (SEG1) may use sub-carriers 0, 3, 6, 9, . . . , etc.; segment 2 (SEG2) may use sub-carriers 1, 4, 7, 10, . . . , etc.; and segment 3 (SEG3) may use sub-carriers 2, 5, 8, 11, . . . , etc.

Consequently, the MS receives distinct signals from each BS. For example, the MS may receive signals from SEG2 of BS2 on sub-carriers 1, 4, 7, 10, . . . , etc., from SEG1 of BS3 on sub-carriers 0, 3, 6, 9, . . . , etc., and from SEG 3 of BS1 on sub-carriers 2, 5, 8, 11, . . . , etc. Thus, the signals received by the MS may not interfere with each other since their sub-carriers are distinct.

A set of sub-carriers for segment n may be mathematically expressed as follows.

$$PreambleCarrierSet_n = n + 3k$$

where $0 \leq k \leq 283$ for 1024 FFT mode and $0 \leq k \leq 142$ for 512 FFT mode. Additionally, there may be 86 guard sub-carriers on the left and right ends of the spectrum in 1024 FFT mode. In the 512 FFT mode, there may be 42 guard sub-carriers on the left end and 41 guard sub-carriers on the right end.

Typically, when the receiver in the MS is turned on, the MS initially performs symbol timing and carrier frequency synchronization before the MS can detect a preamble sequence. The MS may perform these tasks using a cyclic prefix in the data frame. Thereafter, the MS determines whether a first symbol in the frame is a preamble symbol. If the first symbol is a preamble symbol, then the MS determines which preamble sequence is present in the frame. Once the MS determines the preamble sequence, the MS can associate with a corresponding segment of an appropriate BS.

Symbols in preamble sequences (i.e., preamble symbols) typically have higher energy than data symbols. For example, the energy of the preamble symbols is typically 8/3 times (i.e., 4.26 dB higher than) the energy of data symbols. This is useful in distinguishing preamble symbols from data symbols.

Additionally, the preamble sequences are almost orthogonal. That is, a cross-correlation between any two preamble sequences is very small. For example, the cross-correlation is typically less than 0.2. This is useful in distinguishing individual preamble sequences from one another. As shown in the table in FIG. 4, if the MS detects a preamble sequence having an index 0, then the MS associates with segment 0 of BS having cell ID 0, and so on.

Referring now to FIGS. 5A-5D, a system 150 for detecting a preamble sequence in a mobile station (MS) may be implemented in a physical layer (PHY) module 152 of the MS. The system 150 comprises a correlation module 154 and a control module 156. The correlation module 154 receives an input signal transmitted by a base station (BS). The input signal may be mathematically expressed as follows.

$$Y[k]=H[k]X_i[k]+Z[k]$$

where k is sub-carrier index, i is preamble sequence index, Y[k] is received signal (i.e., input signal), H[k] is channel gain, Xi[k] is transmit signal, and Z[k] is noise.

When a preamble bit (i.e., a preamble symbol) in a preamble sequence is 0, the corresponding transmit signal Xi[k] is 1. When a preamble bit in a preamble sequence is 1, the corresponding transmit signal Xi[k] is −1. That is, when a preamble bit in a preamble sequence is 1, the phase of the sub-carrier in the transmit signal Xi[k] is shifted by π relative to the phase of the sub-carrier when a preamble bit in a preamble sequence is 0.

The system 150 detects a preamble sequence in the input signal as follows. The correlation module 154 correlates the input signal with preamble sequences. The preamble sequences may be stored in memory in the correlation module 154 or the control module 156. Based on the output of the correlation module 154, the control module 156 initially determines whether a first symbol in the input signal is a preamble symbol or a data symbol. If the first symbol is a preamble symbol, then the control module 156 determines an index i of the preamble sequence. Based on the index of the preamble sequence detected, the control module 156 determines which segment transmitted the preamble sequence. Accordingly, the MS associates with that segment.

When all k sub-carriers have a common channel gain H (i.e., when H[k] is independent of k) and when all k sub-carriers have random channel phase, the k sub-carriers are referred to as "almost flat frequency channels." For almost flat frequency channels, the input signal may be mathematically expressed as follows.

$$Y[k]=H[k]X_i[k]+Z[k] \approx HX_i[k]+Z[k]$$

Figure 5A:
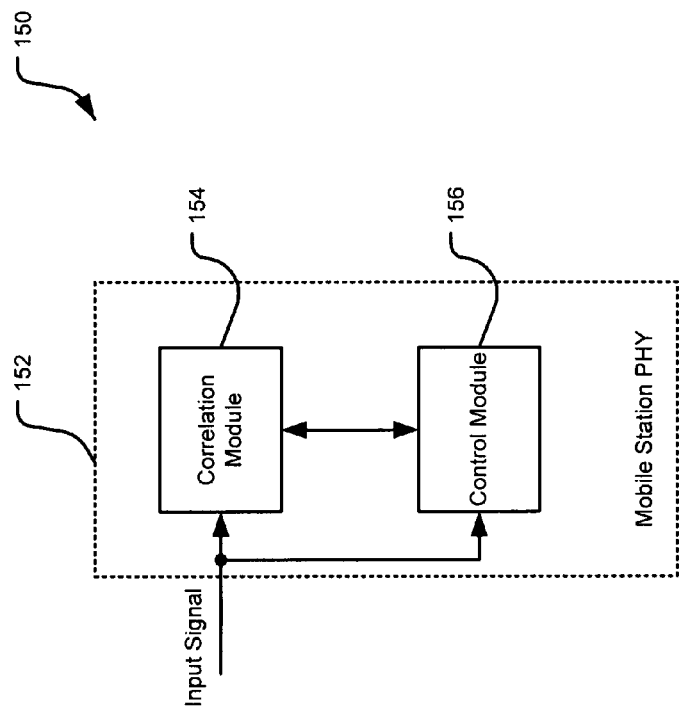
FIG. 5A is a functional block diagram of an exemplary preamble detection system according to the present disclosure.
Figure 5B:
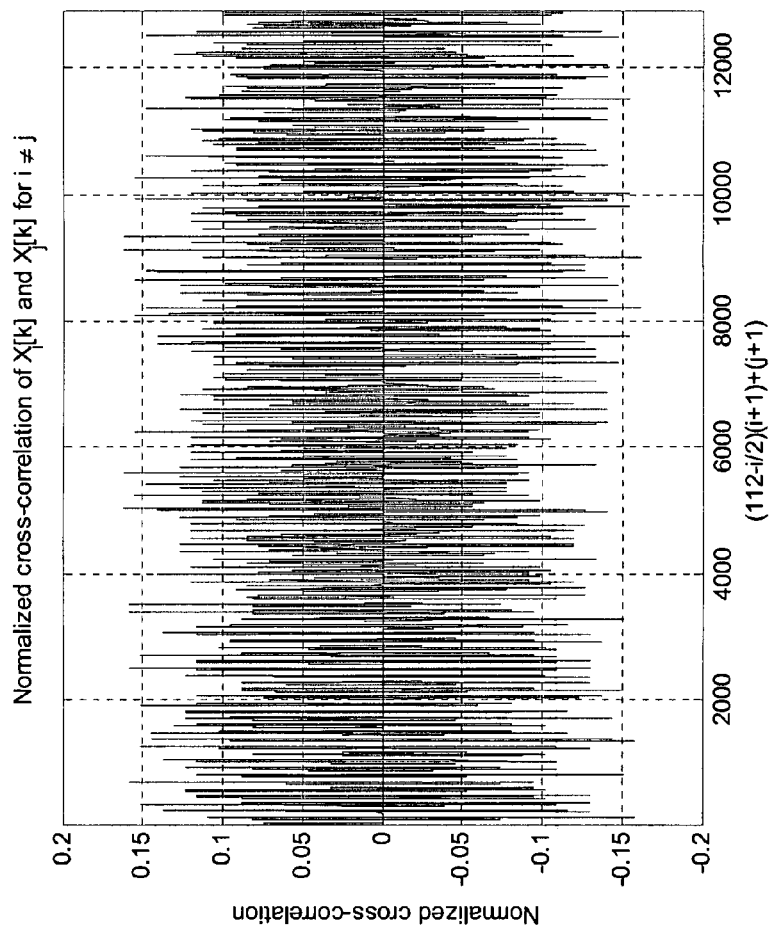
FIG. 5B is a graph showing normalized cross-correlation between preamble sequences of FIG. 4.

A cross-correlation between different preamble sequences is given by the following formula.

$$\max_{i,j \neq i}\left\{ \frac{\left|\sum_{k \in P_{s(i)}} X_i[k]X_j^*[k]\right|}{\sum_{k \in P_{s(i)}} |X_i[k]|^2} \right\} \approx 0.1620 \text{ for } 1024 \text{ } FFT$$

where Ps=set of pilot sub-carriers for segment s except left most pilot sub-carrier, and s(i)=segment number for a preamble sequence index i. FIG. 5B shows cross-correlation values normalized by $$\sum_{k \in P_{s(0)}} |X_0[k]|^2$$

for 1024 FFT mode.

Since the cross-correlation between different preamble sequences is small, the correlation module 154 correlates the input signal with the preamble sequences as follows.

$$C_j = \sum_{k \in P_{s(j)}} Y[k]X_j^*[k]$$

The correlation module 154 performs the correlation for all k sub-carriers and j preamble sequences. Thus, in 1024 FFT mode, the correlation module 154 performs correlation for all 114 preamble sequences.

The correlation module 154 generates correlation values and outputs the correlation values to the control module 156. The control module 156 selects a largest correlation value from the correlation values. The control module 156 calculates a magnitude of the largest correlation value. The control module 156 calculates the magnitude because all sub-carriers have random channel phase, i.e., because sub-carrier channels are almost frequency flat channels. This is mathematically expressed as follows.

$$\hat{i} = \underset{j}{\operatorname{argmax}}\{|C_j|\}$$

The control module 156 compares the magnitude of the largest correlation value to a predetermined threshold. The predetermined threshold is a function of signal strength of the input signal. If the magnitude of the largest correlation value is greater than or equal to the predetermined threshold, the control module 156 determines that a preamble sequence is detected in the input signal.

Thereafter, the control module 156 determines which segment transmitted the preamble sequence that the control module 156 detected in the input signal. The input signal may be a sum of up to three signals that may be transmitted by three different segments of three different base stations. This is mathematically expressed as follows.

$$Y[k] = \sum_{s=0}^{2} H[k,s]X_{i(s)}[k] + Z[k]$$

where i(s)=preamble sequence index used for segment s, $X_{i(s)}[k]$=preamble OFDMA symbol of segment s, and H[k, s]=channel gain corresponding to the segment s.

The control module 156 determines which segment transmitted the preamble sequence implicitly when the control module 156 detects the preamble sequence. This is because each preamble sequence is unique as identified by a unique preamble sequence index number, and each segment transmits a unique preamble sequence using distinct sub-carriers.

Thus, when the control module 156 detects the preamble sequence by selecting the largest correlation value, the control module 156 implicitly selects the segment having maximum channel gain. Thus, when the control module 156 detects the preamble sequence, the control module 156 implicitly detects which segment transmitted the preamble sequence.

Occasionally, the input signal may comprise a carrier frequency offset (CFO). The CFO may be fractional or integer. An input signal comprising fractional CFO may be mathematically expressed as follows.

$$Y[k]=C(\epsilon,0)H[k]X[k]+I(\epsilon,k)+Z[k]$$

where $\epsilon = \Delta fNT$ represents normalized CFO. Fractional CFO introduces Inter-carrier interference (ICI) as given by the following equation.

$$I(\varepsilon, k) = \sum_{r=1}^{N-1} C(\varepsilon, r)H[((k-r))_N]X[((k-r))_N]$$

where N equals total number of sub-carriers (e.g., N=1024 in 1024 FFT mode), $$\text{and } C(\varepsilon, r) = \frac{\sin(\pi(\varepsilon-r))}{N\sin(\pi(\varepsilon-r)/N)}e^{j\pi(\varepsilon-r)(1-1/N)}$$

Additionally, the fractional CFO decreases signal to noise ratio (SNR) of the input signal. This is mathematically expressed as follows.

$$E[SNR(\varepsilon, k)] \approx \frac{|C(\varepsilon, 0)|^2 SNR_0}{(1 - |C(\varepsilon, 0)|^2)SNR_0 + 1}$$

where $SNR_0$ represents average SNR in absence of CFO. SNR decreases as CFO increases.

Since fractional CFO introduces ICI and attenuates the input signal, the fractional CFO adversely affects preamble sequence detection in system 150. The fractional CFO, however, does not affect the preamble sequence detection significantly. This is because the fractional CFO adds a phase error that is common to all sub-carriers, which does not change the frequency selectivity of the channels.

On the other hand, when the CFO is an integer I, a phase error θ introduced by the integer CFO may be common to all k sub-carriers. In that case, the input signal may be mathematically expressed as follows.

$$Y[k] = e^{j\theta}H[((k-l))_N]X_i[((k-l))_N] + Z[((k-l))_N]$$

Specifically, the integer CFO causes a cyclic shift of the input signal in the frequency domain. In other words, the integer CFO rotates the input signal in the frequency domain. Accordingly, the correlation module 154 correlates preamble sequences with a shifted version of the input signal as given by the following equation.

$$C_{j,m} = \sum_{k \in P_{s(j)}} Y[((k-m))_N]X_j^*[k]$$

Consequently, the control module 156 detects the preamble sequence by selecting a maximum correlation value according to the following equation.

$$(\hat{i}, \hat{l}) = \underset{(j,m)}{\operatorname{argmax}}\{|C_{j,m}|\}$$

Figure 5C:
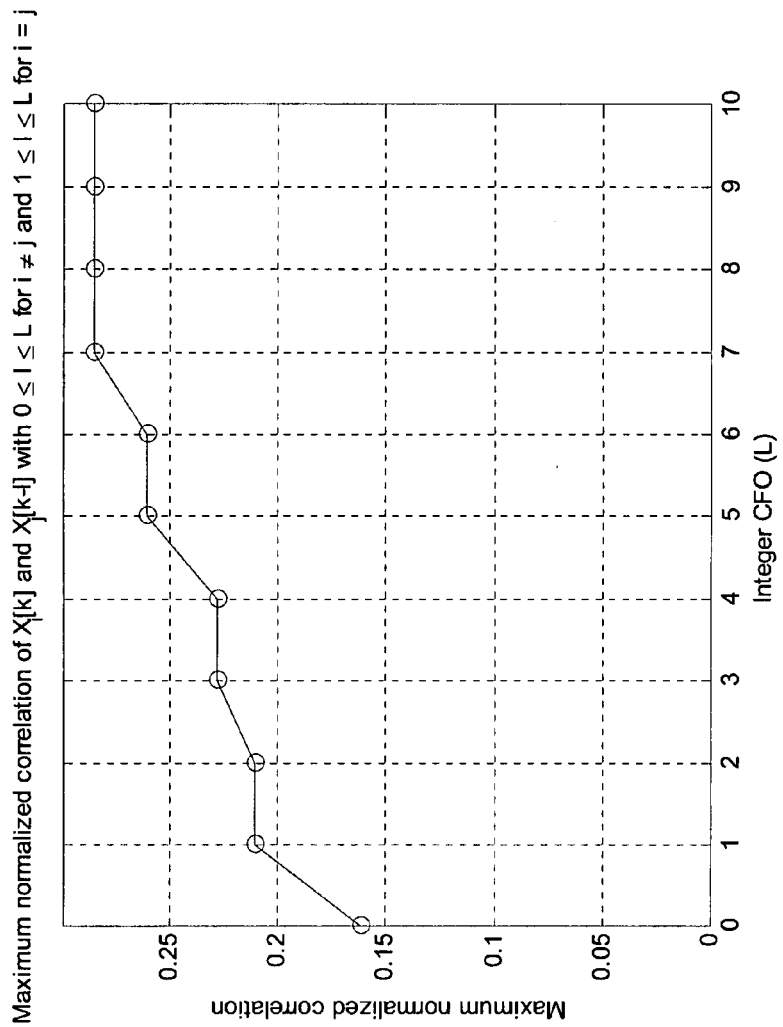
FIG. 5C is a graph showing normalized cross-correlation between preamble sequences of FIG. 4 when integer carrier frequency offset is present.

FIG. 5C shows maximum correlation values normalized by $$\sum_{k \in P_{(0)}} |X_0[k]|^2.$$

Figure 5D:
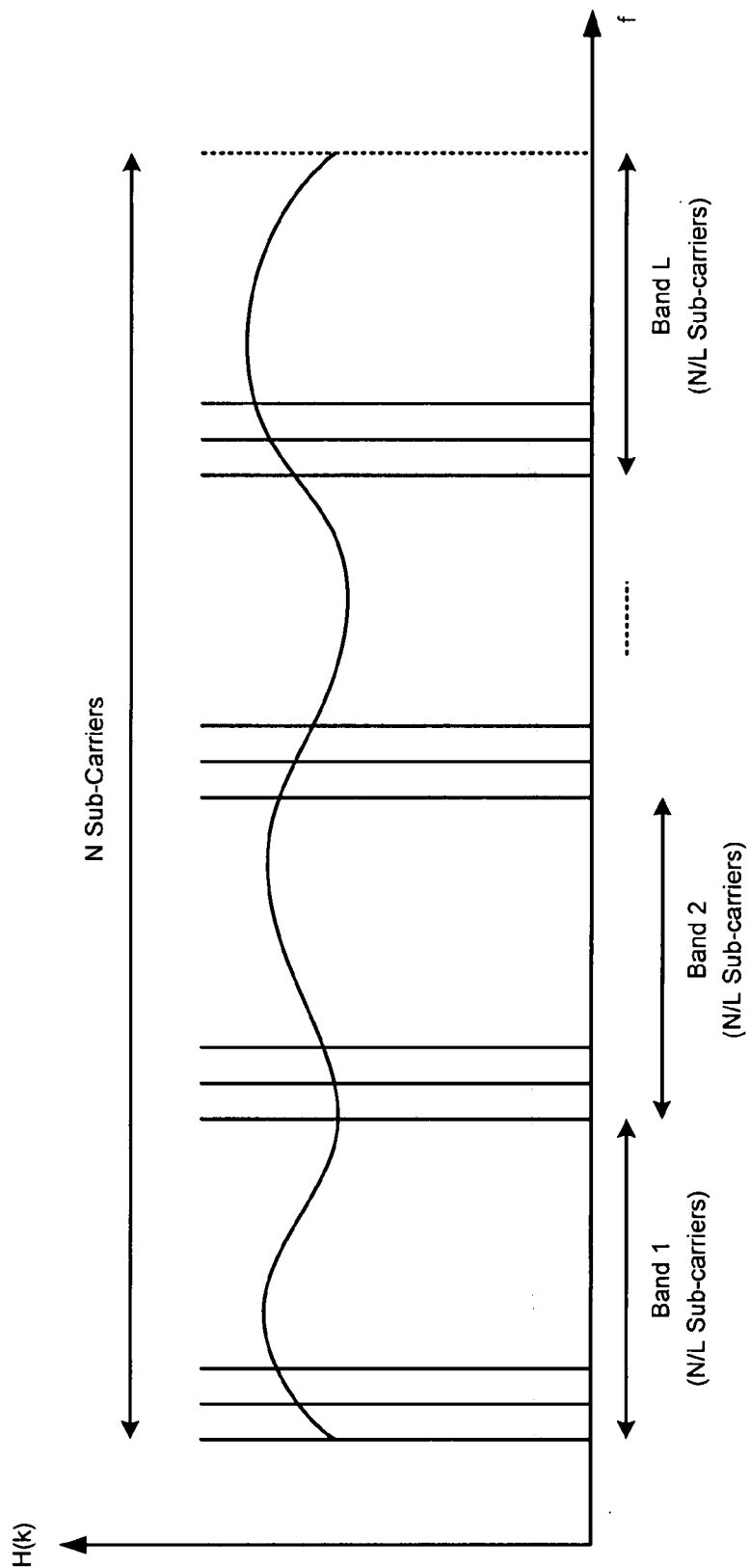
FIG. 5D is a graph showing variation in channel gain relative to sub-carrier frequency in a highly frequency-selective channel.

Occasionally, the channel may not be almost frequency flat. That is, the sub-carriers in a channel may not have a common channel gain H. In other words, H[k] may not be independent of k. In that case, the channel gain may vary with frequency of sub-carriers as shown in FIG. 5D. Such a channel is called highly frequency selective channel. In a highly frequency selective channel, the variation in channel gain significantly changes the phase of sub-carriers and distorts the correlation between transmitted and expected preamble sequences. Consequently, the system 150 cannot reliably detect correct preamble sequences by correlating all of the sub-carriers with each of the preamble sequences.

However, the system 150 can estimate a preamble sequence index by partitioning the channel into bands, wherein the channel may be relatively frequency flat, and then correlating on a per-band basis. Specifically, the control module 156 partitions the total number of sub-carriers into a predetermined number of bands. If N denotes a total number of sub-carriers in a channel, the control module 156 divides the channel in to L bands, each comprising N/L consecutive sub-carriers as shown in FIG. 5D. For example, in 1024 FFT mode, the control module 156 may divide the 1024 sub-carriers into 16 bands, each comprising 64 successive sub-carriers. Thus, band 1 may include sub-carriers 1-64, band 2 may include sub-carriers 65-128, . . . , and band 16 may include sub-carriers 961-1024.

Assuming that the channel gain does not vary significantly among the sub-carriers within individual bands although the channel gain varies across the bands, the correlation module 154 performs correlation on a per-band basis. Specifically, the correlation module 154 correlates symbols in modulated sub-carriers in a band with corresponding symbols in a preamble sequence and generates correlation values for the band, which may be called intra-band correlation values. The control module 156 adds the intra-band correlation values and generates a magnitude of a sum of the intra-band correlation values, which may be called a band correlation value.

Thus for a preamble sequence, the control module 156 generates L band correlation values. The control module 156 adds the L band correlation values to generate a correlation value for the preamble sequence. Thus, the correlation module 154 performs correlation for all i preamble sequences, and the control module 156 generates i correlation values. The effect of variation in channel gain on the phase of sub-carriers and the consequent distortion in correlation is minimized by correlating on a per-band basis and by generating correlation values based on band correlation values.

The control module 156 selects a largest correlation value from the i correlation values. This is mathematically expressed as follows.

$$\hat{i} = \underset{i}{\operatorname{argmax}}\left\{\sum_{l=0}^{L-1}\left|\sum_{k=l(N/L)}^{(l+1)(N/L)-1} Y[k]X_i^*[k]\right|\right\}$$

The control module 156 compares the largest correlation value to a predetermined threshold. The predetermined threshold is a function of signal strength of the input signal. If the largest correlation value is greater than or equal to the predetermined threshold, the control module 156 determines that a preamble sequence is detected in the input signal. Since each preamble sequence is unique, the control module 156 determines which segment transmitted the preamble sequence implicitly when the control module 156 detects the preamble sequence.

Figure 6A:
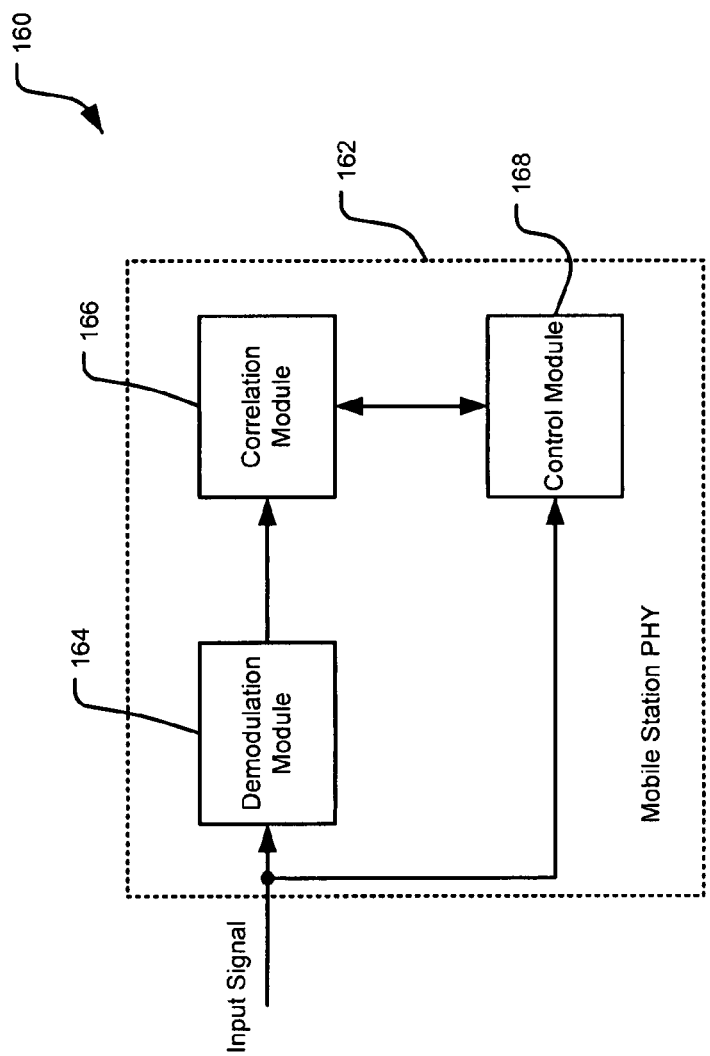
FIG. 6A is a functional block diagram of an exemplary preamble detection system according to the present disclosure.

Referring now to FIG. 6A, a system 160 for detecting a preamble sequence in a mobile station (MS) may be implemented in a physical layer (PHY) module 162 of the MS. The system 160 comprises a differential demodulation module 164, a correlation module 166, and a control module 168. The differential demodulation module 164 receives an input signal transmitted by a base station (BS). The input signal may be mathematically expressed as follows.

$$Y[k] = H[k]X_i[k] + Z[k]$$

where k is sub-carrier index, i is preamble sequence index, Y[k] is received input signal, H[k] is channel gain, Xi[k] is transmit signal, and Z[k] is noise.

Adjacent modulated sub-carriers (i.e., sub-carriers 1, 4, 7, etc.) may have similar channel phase or an unknown differential channel phase that is common to all k sub-carriers. The unknown differential channel phase may be caused by presence of a symbol timing offset, which in turn may be caused by improper symbol timing synchronization. When adjacent modulated sub-carriers have similar channel phase, the channel phase difference between adjacent modulated sub-carriers is nearly zero.

On the other hand, when adjacent modulated sub-carriers have an unknown differential channel phase that is common to all k sub-carriers, the channel phase difference between adjacent modulated sub-carriers may be non-zero. When adjacent modulated sub-carriers have similar channel phase or unknown differential channel phase common to all sub-carriers, the sub-carriers are generally referred to as "moderately frequency selective channels."

The differential demodulation module 164 performs a differential demodulation operation on the input signal and generates a differentially demodulated signal. Specifically, the differential demodulation module 164 multiplies a modulated sub-carrier by a complex conjugate of an adjacent modulated sub-carrier located three sub-carriers apart.

When the adjacent modulated sub-carriers have similar channel phase, the differentially demodulated signal can be mathematically expressed as follows.

$$M[k]=Y^*[k-3]Y[k]=H[k]H^*[k-3]D_i[k]+\tilde{Z}[k]\approx |H[k]H^*[k-3]|D_i[k]+\tilde{Z}[k]$$

where $Y^*[k-3]$ denotes a complex conjugate of a modulated sub-carrier that is three sub-carriers apart from the modulated sub-carrier $Y[k]$. The complex conjugate is indicated by asterisk or "*". Since the adjacent modulated sub-carriers have similar channel phase, the channel phase difference between the adjacent modulated sub-carriers is nearly zero. That is, $$\angle(H[k]H^*[k-3])\approx 0$$

The correlation module 166 or the control module 168 stores XOR'ed versions of preamble sequences in memory. XOR'ed versions of preamble sequences may also be referred to as derived preamble sequences. An XOR'ed or derived preamble sequence is generated by XORing adjacent bits in the preamble sequence. For example, if one of the 114 preamble sequences in 1024 FFT mode includes bits B1, B2, B3, ..., B284, then an XOR'ed version of that preamble sequence includes bits X1, X2, X3, ..., X284, where X1=B1xorB2, X2=B2xorB3, etc. The derived preamble sequences may be mathematically expressed as follows.

$$D_i[k]=X_i[k]X_i^*[k-3]$$

where the asterisk (i.e., "*") denotes a complex conjugate. Actually performing complex conjugate operations to generate complex conjugates, however, is unnecessary since complex conjugates of 1 and −1 are 1 and −1, respectively. That is, $1^*=1$, and $(-1)^*=-1$.

A cross-correlation between the derived preamble sequences is given by the following formula.

$$\max_{i,j\neq i}\left\{\frac{\sum_{k\in P_{s(i)}}D_i[k]D_j^*[k]}{\sum_{k\in P_{s(i)}}|D_i[k]|^2}\right\}\approx 0.1731 \text{ for } 1024 \text{ } FFT$$

Figure 6B:
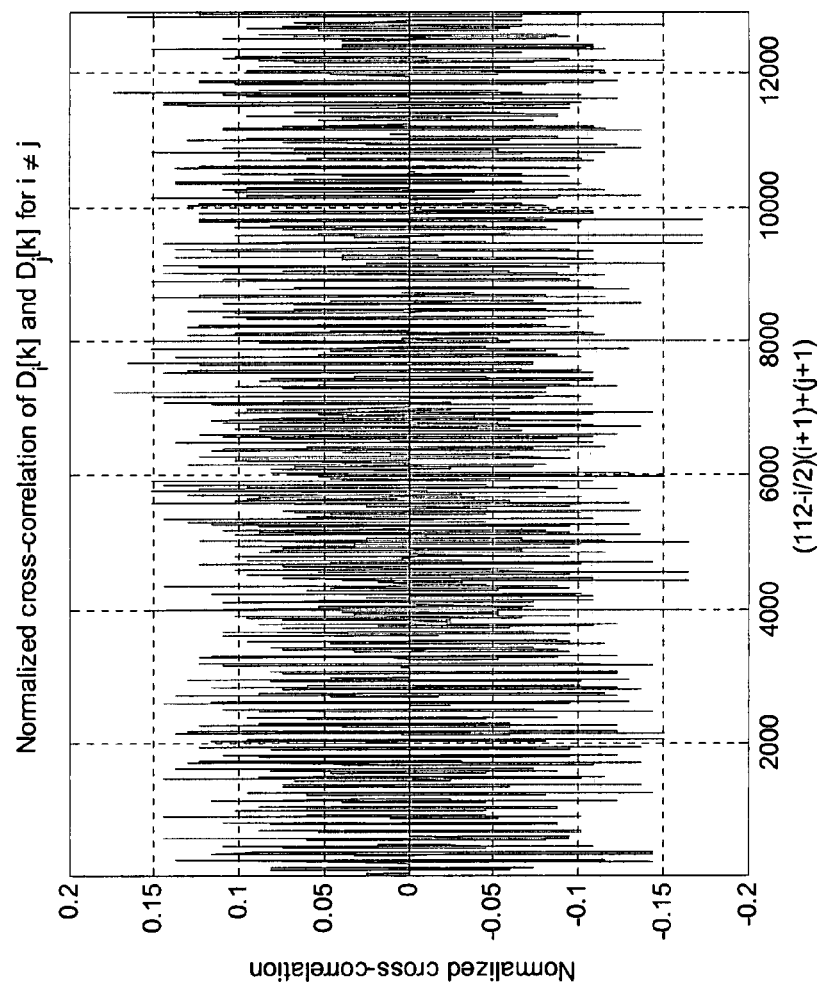
FIG. 6B is a graph showing normalized cross-correlation between preamble sequences derived from the preamble sequences shown in FIG. 4.

FIG. 6B shows cross-correlation values normalized by $$\sum_{k\in P_{s(0)}}|D_0[k]|^2$$

for 1024 FFT mode.

Since the cross-correlation between the derived preamble sequences is small, the correlation module 166 correlates the differentially demodulated input signals with the derived preamble sequences as follows.

$$C_j=\sum_{k\in P_{s(j)}}M[k]D_j^*[k]$$

The correlation module 166 performs the correlation for all k sub-carriers and j preamble sequences. Thus, in the 1024 FFT mode, the correlation module 166 performs the correlation for all modulated 114 preamble sequences. Since the values of $D_j[k]$ (reference to complex conjugate by "*" omitted) are either 1 or −1, effectively $M[k]D_j[k]=\pm M[k]$.

The correlation module 166 generates correlation values and outputs the correlation values to the control module 168. The correlation values are complex numbers, which have real and imaginary parts. The imaginary parts of the correlation values represent noise in the input signal. The control module 168 disregards the imaginary parts since $\angle(H[k]H^*[k-3])\approx 0$.

The control module 168 selects a correlation value having a largest real part. This is mathematically expressed as follows.

$$\hat{i}=\underset{j}{\text{argmax}}\{\text{Re}\{C_j\}\}$$

The control module 168 compares the largest real part to a predetermined threshold. The predetermined threshold is a function of signal strength of the input signal. If the largest real part is greater than or equal to the predetermined threshold, the control module 168 determines that a preamble sequence is detected in the input signal. As in system 150, the control module 168 implicitly determines which segment transmitted the preamble sequence when the control module 168 detects the preamble sequence.

On the other hand, when the adjacent modulated sub-carriers have an unknown differential channel phase θ that is common to all k sub-carriers, the demodulated signal generated by the demodulation module 164 is given by the following equation.

$$M[k]=H[k]H^*[k-3]D_i[k]+\tilde{Z}[k]\approx e^{j\theta}|H[k]H^*[k-3]|D_i[k]$$

where $\angle(H[k]H^*[k-3])\approx\theta$ is not zero.

Since the cross-correlation between the derived preamble sequences is small, the correlation module 166 performs correlation and generates correlation values similar to when the adjacent modulated sub-carriers have similar channel phase. However, because $\angle(H[k]H^*[k-3])\approx\theta$ is not zero, the control module 168 calculates magnitude of the largest correlation value instead of selecting real part of the largest correlation value. That is, the control module 168 does not disregard the imaginary part of the largest correlation value. This is mathematically expressed as follows.

$$\hat{i}=\underset{j}{\text{argmax}}\{|C_j|\}$$

The control module 168 compares the magnitude of the largest correlation value to a predetermined threshold. The predetermined threshold is a function of signal strength of the input signal. If the magnitude of the largest correlation value is greater than or equal to the predetermined threshold, the control module 168 determines that a preamble sequence is detected in the input signal. As in system 150, the control module 168 implicitly determines which segment transmitted the preamble sequence when detecting the preamble sequence.

Figure 6C:
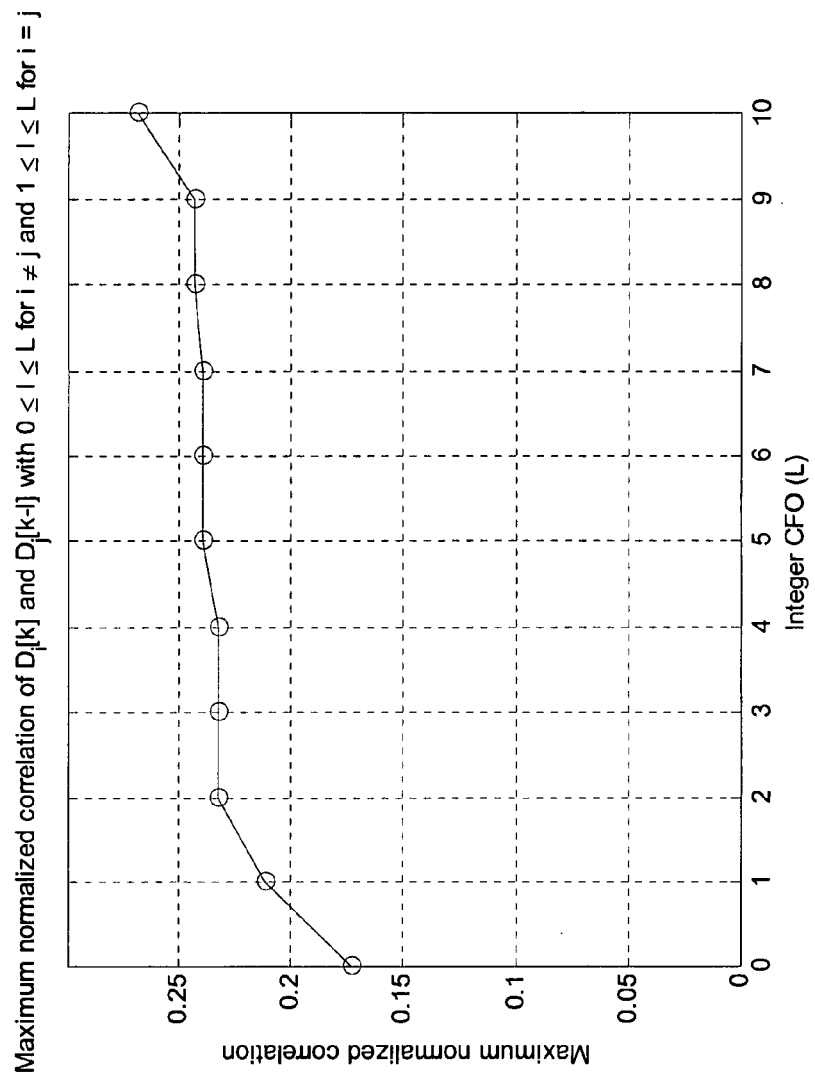
FIG. 6C is a graph showing normalized cross-correlation between derived preamble sequences when integer carrier frequency offset is present.

As in system 150, the preamble sequence detection in system 160 is not affected by a fractional CFO present in the input signal. When an integer CFO is present in the input signal, the differential demodulation module 164 differentially demodulates the input signal having the integer CFO. The correlation module 166 correlates derived preamble sequences with differentially demodulated input signal having the integer CFO. The control module 168 performs preamble detection according to the channel phase of adjacent modulated sub-carriers. FIG. 6C shows maximum correlation values normalized by $$\sum_{k \in P_{s(0)}} |D_0[k]|^2.$$

Occasionally, the input signal may have a small symbol timing offset due to improper symbol timing synchronization, which is performed when the MS is powered up. The symbol timing offset may cause inter-symbol interference (ISI). Additionally, the symbol timing offset may cause an inter-carrier interference (ICI). The input signal having a symbol timing offset can be mathematically expressed as follows.

$$Y[k] = \exp\left(\frac{j2\pi\tau k}{N}\right) H[k] X_i[k] + I(\tau, k) + Z[k]$$

where $\tau$ represents symbol timing offset and $I(\tau,k)$ represents ISI and ICI.

Specifically, the symbol timing offset introduces an extra phase offset among the sub-carriers. The phase offset may increase linearly as the sub-carrier index k increases. In that case, system 160 may perform better than system 150. Additionally, the extra phase offset introduced by the symbol timing offset appears in the differentially demodulated signal generated by the differential demodulation module 164. Therefore, system 160 utilizing magnitude of a largest correlation value may perform better than system 160 utilizing largest real part of a correlation value.

The differentially demodulated signal with the extra phase offset is mathematically expressed as follows.

$$M[k] = \exp\left(\frac{j6\pi\tau}{N}\right) H[k] H^*[k-3] D_i[k] + Z'[k]$$

If the linearly increasing phase offset is too large, the control module 168 calculates magnitude of the largest correlation value instead of selecting a largest real part of a correlation value.

In system 160 utilizing magnitude of the largest correlation value, the control module 168 estimates symbol timing offset as follows. After calculating a magnitude of a largest correlation value, the control module 168 measures a phase of the correlation value having the largest magnitude. The control module 168 calculates symbol timing offset by multiplying the phase of the correlation value having the largest magnitude by a ratio of N to $3*2\pi$. Mathematically, this may be expressed as follows.

$$C_j = \sum_{k \in P_{s(j)}} M[k] D_j^*[k]$$

$$\hat{i} = \operatorname*{argmax}_j \{|C_j|\}$$

$$\hat{\tau} = \frac{N}{6\pi} \angle C_{\hat{i}}$$

where $\angle C_{\hat{i}}$ is the phase angle of the correlation value having the largest magnitude, and N is total number of sub-carriers in an FFT mode (e.g., N=1024 in 1024 FFT mode). Additionally, the multiplier 3 is used to multiply $2\pi$ since every third sub-carrier is modulated. Thus, the multiplier may be P when every $P^{th}$ sub-carrier is modulated, where P is an integer greater than or equal to 1.

Figure 7A:
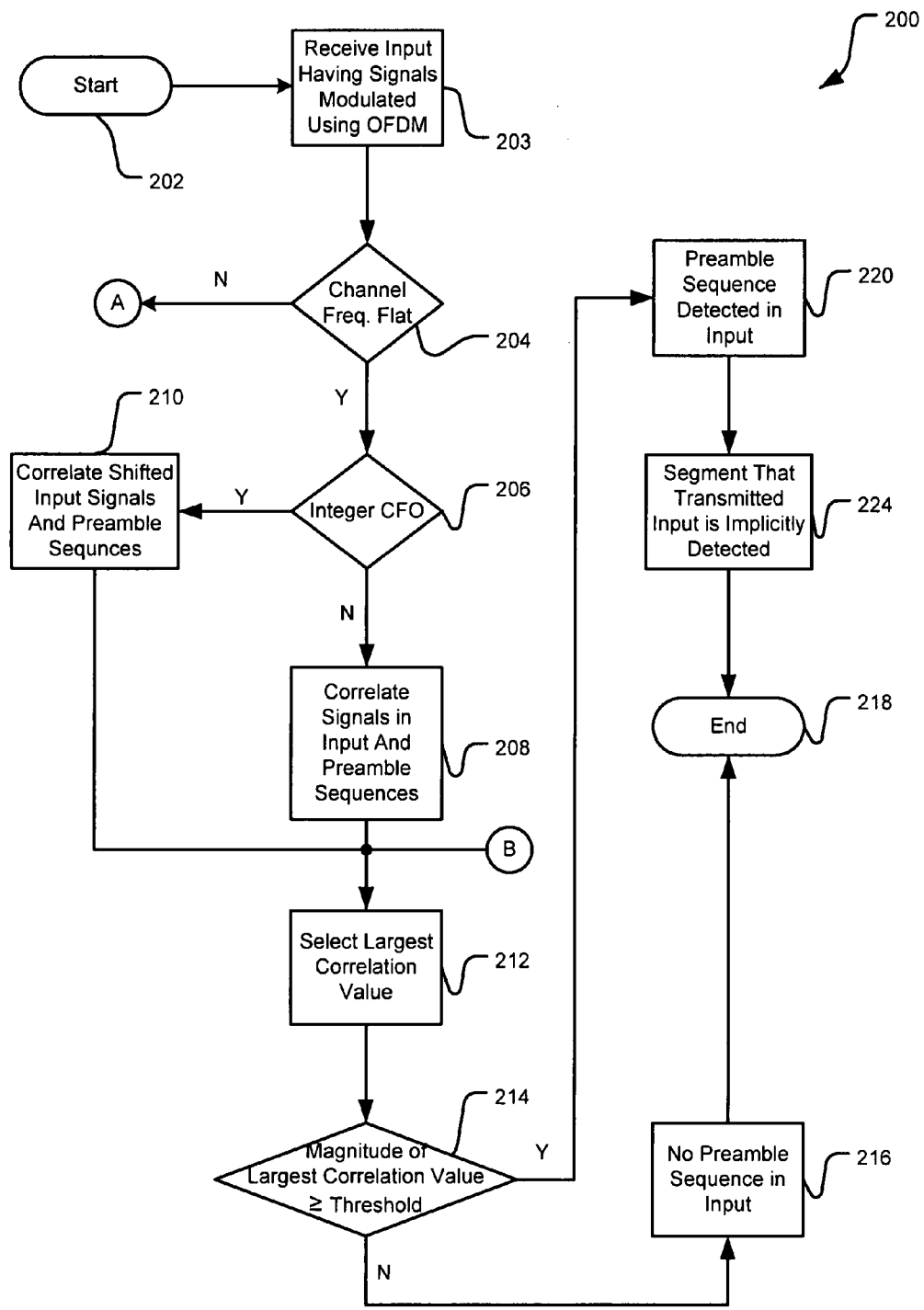
FIGS. 7A-7B depict a flowchart of an exemplary method for preamble detection according to the present disclosure.
Figure 7B:
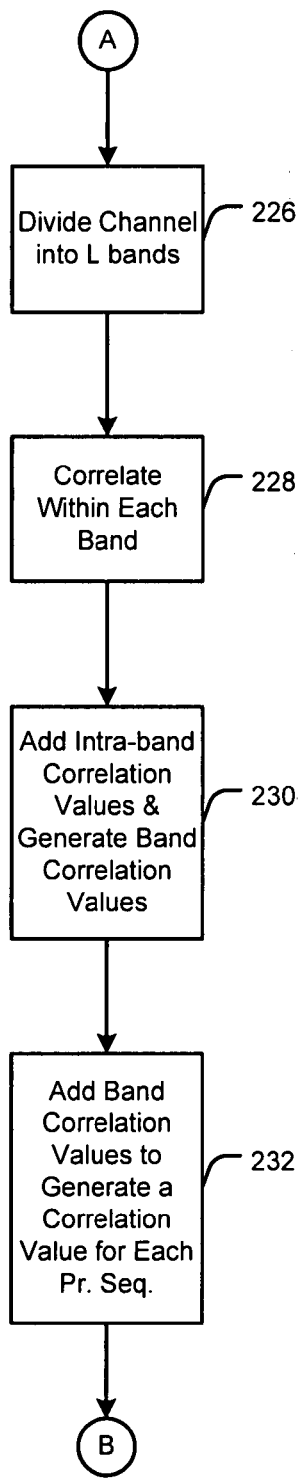

Referring now to FIGS. 7A-7B, a method 200 for detecting a preamble sequence begins at step 202. A correlation module 154 receives an input signal having signals modulated using orthogonal frequency division multiplexing (OFDM) in step 203. A control module 156 determines whether a channel is almost frequency flat in step 204. If true, a control module 156 determines in step 206 if an integer carrier frequency offset (CFO) is present in the input signal. If the integer CFO is absent, the correlation module 154 correlates the signals with preamble sequences in step 208. If the integer CFO is present, however, the correlation module 154 correlates the signals shifted by the integer CFO with preamble sequences in step 210.

The control module 156 selects in step 212 a largest correlation value from the correlation values generated by the correlation module 154. The control module 156 checks if a magnitude of the largest correlation value exceeds a predetermined threshold in step 214. If false, the control module 156 determines in step 216 that no preamble sequence is detected in the input signal, and the method 200 ends in step 218.

If true, however, the control module 156 determines that a preamble sequence is detected in the input signal in step 220. Since each preamble sequence is unique and since each segment of each base station transmits using distinct sub-carriers, the control module 156 implicitly determines in step 224 which segment of a base station transmitted the detected preamble sequence. The method 200 ends in step 218.

If, however, the result of step 203 is false, the control module 156 divides the channel into L bands in step 226. The correlation module 154 correlates on a per-band basis and generates intra-band correlation values in step 228. The control module 156 adds the intra-band correlation values and generates a magnitude of a sum of the intra-band correlation values to generate a band correlation value in step 230, thereby generating L band correlation values for each preamble sequence.

The control module 156 adds the band correlation values for a preamble sequence to generate a correlation value for the preamble sequence in step 232, thereby generating i correlation values for i preamble sequences in step 232. Steps starting at step 212 are performed thereafter.

Figure 8:
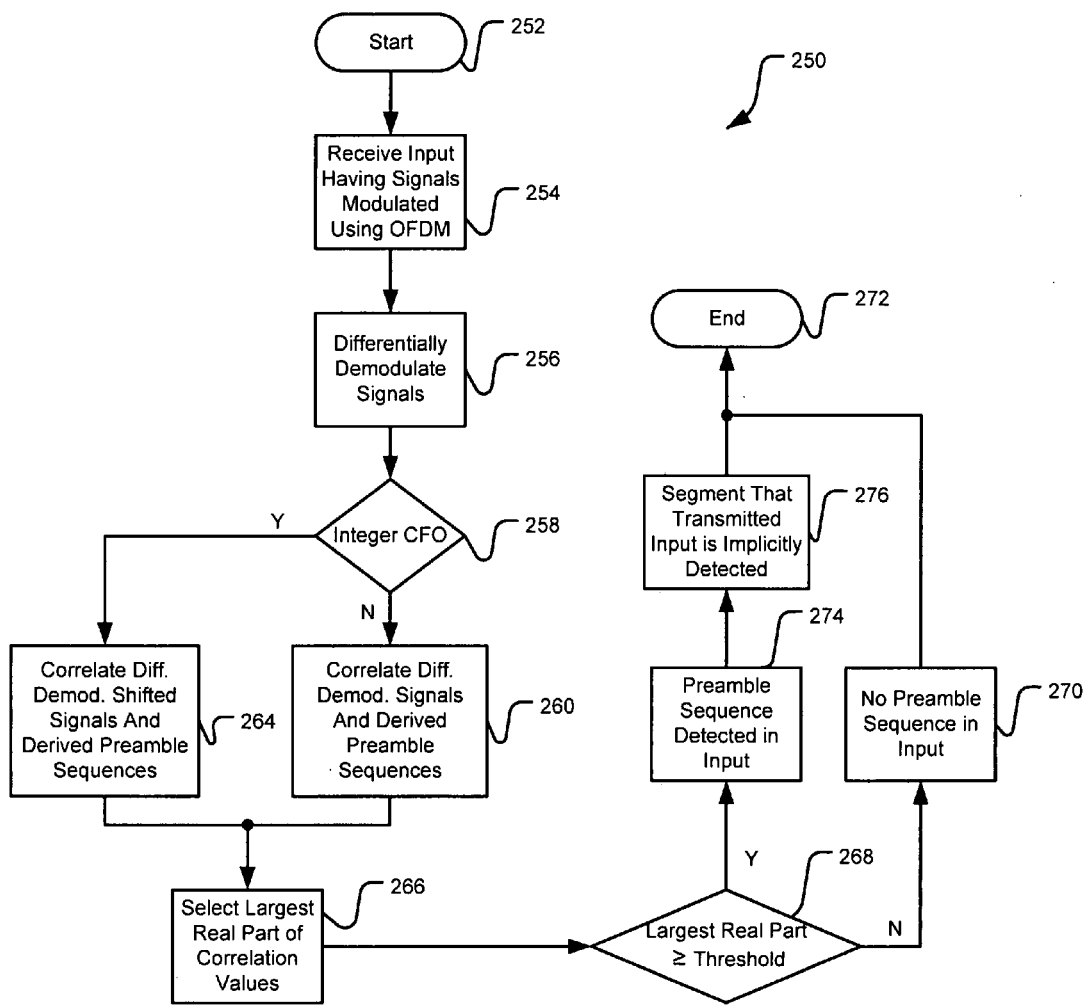
FIG. 8 is a flowchart of an exemplary method for preamble detection when sub-carriers have substantially similar channel phase.

Referring now to FIG. 8, a method 250 for detecting a preamble sequence when moderately frequency selective channels have substantially the same channel phase begins at step 252. A differential demodulation module 164 receives an input signal having signals modulated using orthogonal frequency division multiplexing (OFDM) in step 254. The differential demodulation module 164 differentially demodulates the signals in step 256.

A control module 168 determines in step 258 if an integer carrier frequency offset (CFO) is present in the input signal. If the integer CFO is absent, a correlation module 166 correlates the differentially demodulated signals with derived preamble sequences in step 260. If the integer CFO is present, however, the correlation module 166 correlates in step 264 the derived preamble sequences with the differentially demodulated signals that include the shift caused by the integer CFO.

The control module 168 selects in step 266 a largest real part of correlation values generated by the correlation module 166. The control module 168 checks if the largest real part is greater than or equal to a predetermined threshold in step 268. If false, the control module 168 determines in step 270 that no preamble sequence is detected in the input signal, and the method 250 ends in step 272.

If true, however, the control module 168 determines that a preamble sequence is detected in the input signal in step 274. Since each preamble sequence is unique and since each segment of each base station transmits using distinct sub-carriers, the control module 168 implicitly determines in step 276 which segment of a base station transmitted the detected preamble sequence. The method 250 ends in step 272.

Figure 9:
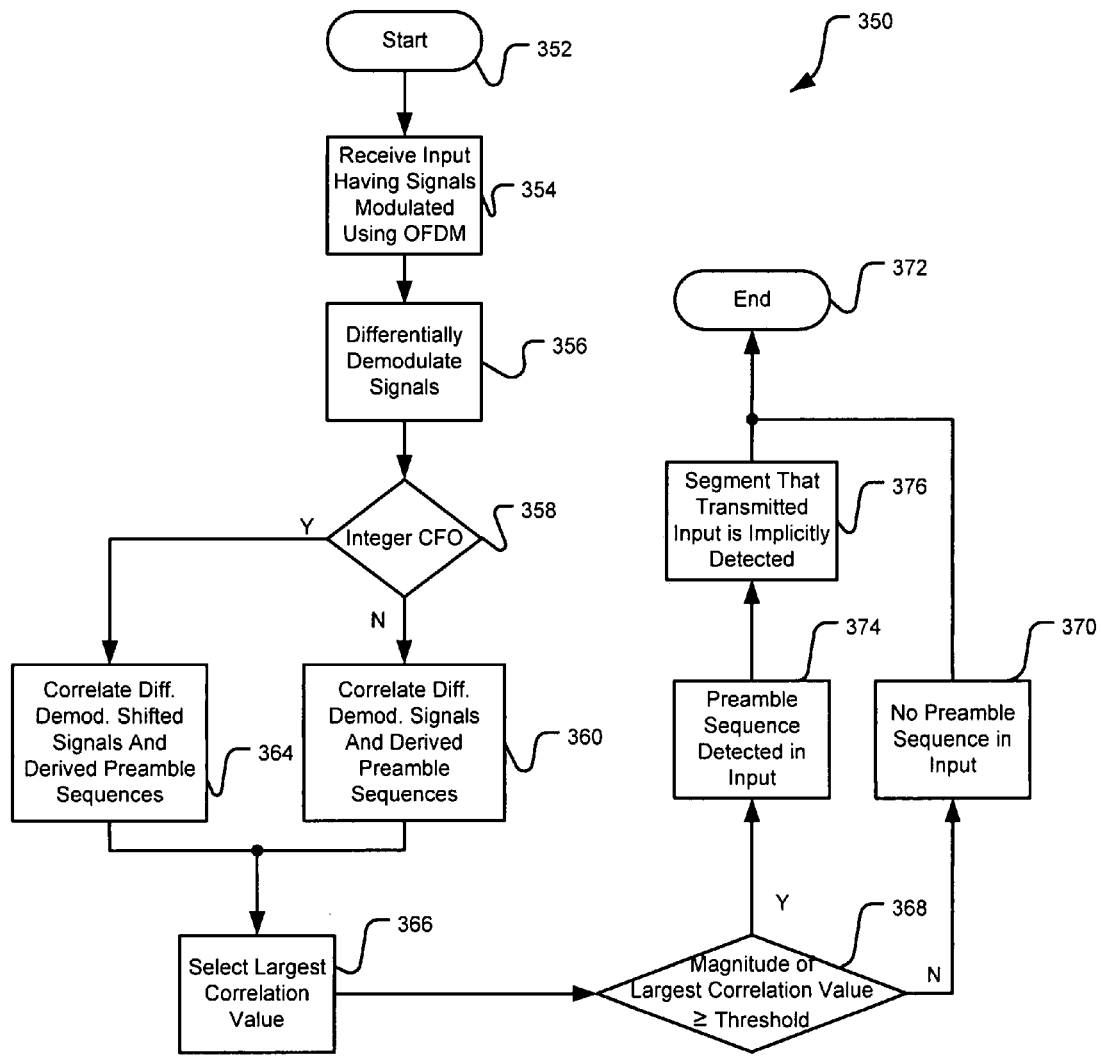
FIG. 9 is a flowchart of an exemplary method for preamble detection when sub-carriers have an unknown differential similar channel phase.

Referring now to FIG. 9, a method 350 for detecting a preamble sequence when moderately frequency selective channels have substantially the same differential channel phase begins at step 352. A differential demodulation module 164 receives an input signal having signals modulated using orthogonal frequency division multiplexing (OFDM) in step 354. The differential demodulation module 164 differentially demodulates the signals in step 356.

A control module 168 determines in step 358 if an integer carrier frequency offset (CFO) is present in the input signal. If the integer CFO is absent, a correlation module 166 correlates the differentially demodulated signals with derived preamble sequences in step 360. If the integer CFO is present, however, the correlation module 166 correlates in step 364 the derived preamble sequences with the differentially demodulated signals that include the shift caused by the integer CFO.

The control module 168 selects in step 366 a largest correlation value from the correlation values generated by the correlation module 166. The control module 168 checks if a magnitude of the largest correlation value is greater than or equal to a predetermined threshold in step 368. If false, the control module 168 determines in step 370 that no preamble sequence is detected in the input signal, and the method 350 ends in step 372.

If true, however, the control module 168 determines that a preamble sequence is detected in the input signal in step 374. Since each preamble sequence is unique and since each segment of each base station transmits using distinct sub-carriers, the control module 168 implicitly determines in step 376 which segment of a base station transmitted the detected preamble sequence. The method 350 ends in step 372.

Although every third sub-carrier is modulated as described in the systems and methods disclosed in this disclosure, skilled artisans can appreciate that the systems and methods disclosed herein may be implemented by modulating every $P^{th}$ sub-carrier, where P is an integer greater than 1. Thus, if P=2, the systems and methods disclosed herein may be implemented by modulating every other (i.e., alternate) sub-carrier, etc.

Figure 10B:
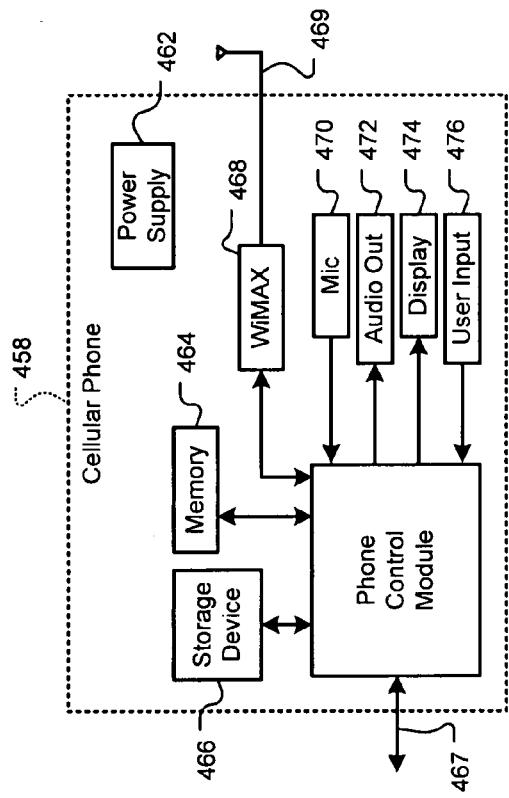
FIG. 10B is a functional block diagram of a cellular phone.
Figure 10A:
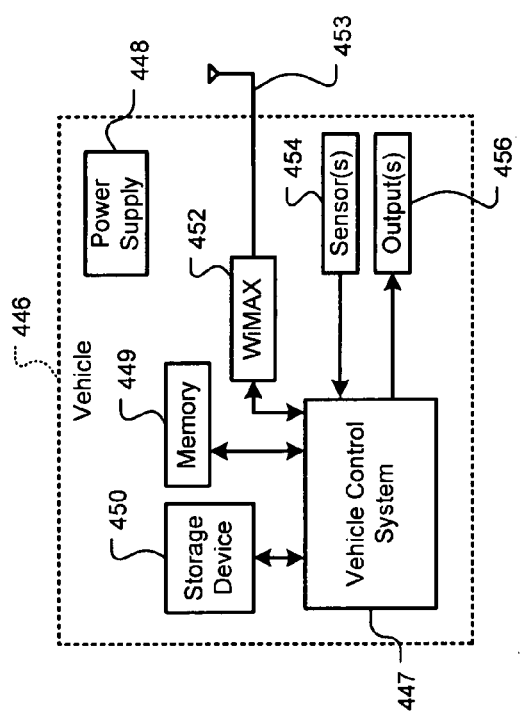
FIG. 10A is a functional block diagram of a vehicle control system.

Referring now to FIGS. 10A-10B, various exemplary implementations incorporating the teachings of the present disclosure are shown. For example, the teachings of the present disclosure may be implemented in communication systems based on WiMAX standards, which provide mobile wireless connectivity without the need for a direct line-of-sight with a base station.

Referring now to FIG. 10A, the teachings of the disclosure may be implemented in a WiMAX interface 452 of a vehicle 446. The vehicle 446 may include a vehicle control system 447, a power supply 448, memory 449, a storage device 450, and the WiMAX interface 452 and associated antenna 453. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the WiMAX interface 452.

Referring now to FIG. 10B, the teachings of the disclosure can be implemented in a WiMAX interface 468 of a cellular phone 458. The cellular phone 458 includes a phone control module 460, a power supply 462, memory 464, a storage device 466, and a cellular network interface 467. The cellular phone 458 may include the WiMAX interface 468 and associated antenna 469, a microphone 470, an audio output 472 such as a speaker and/or output jack, a display 474, and a user input device 476 such as a keypad and/or pointing device.

The phone control module 460 may receive input signals from the cellular network interface 467, the WiMAX interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the WiMAX interface 468, and the audio output 472.

Memory 464 may include random access memory (RAM) and/or nonvolatile memory such as flash memory, phase change memory, or multi-state memory, in which each memory cell has more than two states. The storage device 466 may include an optical storage drive, such as a DVD drive, and/or a hard disk drive (HDD). The power supply 462 provides power to the components of the cellular phone 458.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:
1. A system, comprising:
a correlation module configured to generate correlation values based on a correlation of modulated signals with a plurality of preamble sequences, wherein the modulated signals include sub-carriers modulated using orthogonal frequency domain multiplexing (OFDM); and a control module configured to
select a largest correlation value from the correlation values, and
detect one of the preamble sequences in the modulated signals upon determining that a magnitude of the largest correlation value is greater than or equal to a first predetermined threshold,
wherein the control module divides N of the sub-carriers into L bands in response to a channel gain of the sub-carriers not being substantially the same for all of the sub-carriers, where N and L are integers greater than 1, and where each of the L bands includes N/L of the sub-carriers.

2. The system of claim 1, wherein each of the preamble sequences is different from others of the preamble sequences.

3. The system of claim 1, wherein the preamble sequences are stored in one of the correlation module and the control module.

4. The system of claim 1, wherein the control module is configured to identify a segment of a base station that transmitted the modulated signals based on the one of the preamble sequences.

5. The system of claim 1, wherein every $P^{th}$ one of the sub-carriers is modulated with a preamble bit, where P is an integer greater than or equal to 1.

6. The system of claim 1, wherein the sub-carriers have a random channel phase.

7. The system of claim 1, wherein the preamble sequences have a cross-correlation value of less than or equal to a second predetermined threshold.

8. The system of claim 7, wherein the second predetermined threshold is less than approximately 0.2 for an orthogonal frequency domain multiplexing (OFDM) system using a 1024 fast Fourier transform (FFT) mode.

9. The system of claim 1, wherein the first predetermined threshold is based on a signal strength of the modulated signals.

10. The system of claim 1, wherein the modulated signals include a fractional carrier frequency offset (CFO) configured to generate a phase error that is substantially the same in each one of the modulated signals.

11. The system of claim 1, wherein the modulated signals include an integer carrier frequency offset (CFO) configured to generate a phase error that is substantially the same in each one of the modulated signals.

12. A physical layer module (PHY) comprising:
the system of claim 1; and
a transceiver module configured to
communicate with the correlation module and the control module; and
receive the modulated signals.

13. A network device comprising:
the PHY of claim 12; and
at least one antenna configured to communicate with the transceiver module.

14. The system of claim 1, wherein the correlation module is configured to:
correlate symbols in every $P^{th}$ one of the N/L of the sub-carriers in each of the L bands with corresponding symbols in each of the preamble sequences; and
generate intra-band correlation values for each band for each of the preamble sequences,
where P is an integer greater than or equal to 1.

15. The system of claim 14, wherein the control module is configured to:
generate a band correlation value for each of the L bands and for each of the preamble sequences by adding the intra-band correlation values;
generate a magnitude of each of the band correlation value; and
generate the correlation values by adding the magnitude of each of the band correlation value for each of the preamble sequences.

16. A method, comprising:
receiving modulated signals, wherein the modulated signals include sub-carriers modulated using orthogonal frequency domain multiplexing (OFDM);
dividing N of the sub-carriers into L bands in response to a channel gain of the sub-carriers not being substantially the same for all of the sub-carriers, where N and L are integers greater than 1, and where each of the L bands includes N/L of the sub-carriers;
correlating the modulated signals with a plurality of preamble sequences;
generating correlation values based on the correlating;
selecting a largest correlation value from the correlation values; and
detecting one of the preamble sequences in the modulated signals upon determining that a magnitude of the largest correlation value is greater than or equal to a first predetermined threshold.

17. The method of claim 16, further comprising storing the preamble sequences, wherein each of the preamble sequences is different from others of the preamble sequences.

18. The method of claim 16, further comprising identifying a segment of a base station that transmitted the modulated signals based on the one of the preamble sequences.

19. The method of claim 16, wherein every $P^{th}$ one of the sub-carriers is modulated with a preamble bit, where P is an integer greater than or equal to 1, and wherein the sub-carriers have a random channel phase.

20. The method of claim 16, wherein the preamble sequences have a cross-correlation value of less than or equal to a second predetermined threshold.

21. The method of claim 20, further comprising determining that the second predetermined threshold is less than approximately 0.2 for an orthogonal frequency domain multiplexing (OFDM) method using a 1024 fast Fourier transform (FFT) mode.

22. The method of claim 16, further comprising determining the first predetermined threshold based on a signal strength of the modulated signals.

23. The method of claim 16, wherein the modulated signals have a fractional carrier frequency offset (CFO) that generates a phase error that is substantially the same in each one of the modulated signals.

24. The method of claim 16, wherein the modulated signals have an integer carrier frequency offset (CFO) that generates a phase error that is substantially the same in each one of the modulated signals.

25. The method of claim 16, further comprising
correlating symbols in every $P^{th}$ one of the N/L of the sub-carriers in each of the L bands with corresponding symbols in each of the preamble sequences; and
generating intra-band correlation values for each band for each of the preamble sequences,
where P is an integer greater than or equal to 1.

26. The method of claim 25, further comprising:
generating a band correlation value for each of the L bands and for each of the preamble sequences by adding the intra-band correlation values;
generating a magnitude of each of the band correlation value; and
generating the correlation values by adding the magnitude of each of the band correlation value for each of the preamble sequences.

27. A system, comprising:
correlation means for generating correlation values based on a correlation of modulated signals with a plurality of preamble sequences, wherein the modulated signals include sub-carriers modulated using orthogonal frequency domain multiplexing (OFDM); and
control means for
selecting a largest correlation value from the correlation values, and
detecting one of the preamble sequences in the modulated signals upon determining that a magnitude of the largest correlation value is greater than or equal to a first predetermined threshold,
wherein the control means divides N of the sub-carriers into L bands in response to a channel gain of the sub-carriers not being substantially the same for all of the sub-carriers, where N and L are integers greater than 1, and where each of the L bands includes N/L of the sub-carriers.

28. The system of claim 27, wherein each of the preamble sequences is different from others of the preamble sequences.

29. The system of claim 27, wherein the preamble sequences are stored in one of the correlation means and the control means.

30. The system of claim 27, wherein the control means identifies a segment of a base station that transmitted the modulated signals based on the one of the preamble sequences.

31. The system of claim 27, wherein every $P^{th}$ one of the sub-carriers is modulated with a preamble bit, where P is an integer greater than or equal to 1.

32. The system of claim 27, wherein the sub-carriers have a random channel phase.

33. The system of claim 27, wherein the preamble sequences have a cross-correlation value of less than or equal to a second predetermined threshold.

34. The system of claim 33, wherein the second predetermined threshold is less than approximately 0.2 for an orthogonal frequency domain multiplexing (OFDM) system using a 1024 fast Fourier transform (FFT) mode.

35. The system of claim 27, wherein the first predetermined threshold is based on a signal strength of the modulated signals.

36. The system of claim 27, wherein the modulated signals include a fractional carrier frequency offset (CFO) that generates a phase error that is substantially the same in each one of the modulated signals.

37. The system of claim 27, wherein the modulated signals include an integer carrier frequency offset (CFO) that generates a phase error that is substantially the same in each one of the modulated signals.

38. A physical layer means (PHY) comprising:
the system of claim 27; and
transceiver means for communicating with the correlation means and the control means and that receives the modulated signals.

39. A network device comprising:
the PHY means of claim 38; and
at least one antenna means for communicating with the transceiver means.

40. The system of claim 27, wherein the correlation means:
correlates symbols in every $P^{th}$ one of the N/L of the sub-carriers in each of the L bands with corresponding symbols in each of the preamble sequences, and
generates intra-band correlation values for each band for each of the preamble sequences,
where P is an integer greater than or equal to 1.

41. The system of claim 40 wherein the control means:
generates a band correlation value for each of the L bands and for each of the preamble sequences by adding the intra-band correlation values;
generates a magnitude of each of the band correlation value; and
generates the correlation values by adding the magnitude of each of the band correlation value for each of the preamble sequences.

42. A computer program stored on a non-transitory computer-readable medium and executable by a processor, the computer program comprising instructions for:
receiving modulated signals, wherein the modulated signals include sub-carriers modulated using orthogonal frequency domain multiplexing (OFDM);
dividing N of the sub-carriers into L bands in response to a channel gain of the sub-carriers not being substantially the same for all of the sub-carriers, where N and L are integers greater than 1, and where each of the L bands includes N/L of the sub-carriers;
correlating the modulated signals with a plurality of preamble sequences;
generating correlation values based on the correlating;
selecting a largest correlation value from the correlation values; and
detecting one of the preamble sequences in the modulated signals upon determining that a magnitude of the largest correlation value is greater than or equal to a first predetermined threshold.

43. The computer program of claim 42, further comprising instructions for storing the preamble sequences, wherein each of the preamble sequences is different from others of the preamble sequences.

44. The computer program of claim 42, further comprising instructions for identifying a segment of a base station that transmitted the modulated signals based on the one of the preamble sequences.

45. The computer program of claim 42, wherein every $P^{th}$ one of the sub-carriers is modulated with a preamble bit, where P is an integer greater than or equal to 1, and wherein the sub-carriers have a random channel phase.

46. The computer program of claim 42, wherein the preamble sequences have a cross-correlation value of less than or equal to a second predetermined threshold.

47. The computer program of claim 46, further comprising instructions for determining that the second predetermined threshold is less than approximately 0.2 for an orthogonal frequency domain multiplexing (OFDM) computer program using a 1024 fast Fourier transform (FFT) mode.

48. The computer program of claim 42, further comprising instructions for determining the first predetermined threshold based on a signal strength of the modulated signals.

49. The computer program of claim 42, wherein the modulated signals have a fractional carrier frequency offset (CFO) that generates a phase error that is substantially the same in each one of the modulated signals.

50. The computer program of claim 42, wherein the modulated signals have an integer carrier frequency offset (CFO) that generates a phase error that is substantially the same in each one of the modulated signals.

51. The computer program of claim 42, further comprising instructions for:
correlating symbols in every $P^{th}$ one of the N/L of the sub-carriers in each of the L bands with corresponding symbols in each of the preamble sequences; and
generating intra-band correlation values for each band for each of the preamble sequences,
where P is an integer greater than or equal to 1.

52. The computer program of claim 51, further comprising instructions for:
generating a band correlation value for each of the L bands and for each of the preamble sequences by adding the intra-band correlation values,
generating a magnitude of each of the band correlation value, and
generating the correlation values by adding the magnitude of each of the band correlation value for each of the preamble sequences.

* * * * *